(12) United States Patent
Zhou et al.

(10) Patent No.: US 10,720,081 B2
(45) Date of Patent: Jul. 21, 2020

(54) METHOD AND SYSTEM FOR MATCHING PEOPLE WITH CHOICES

(71) Applicant: Juji, Inc., Saratoga, CA (US)

(72) Inventors: Michelle Xue Zhou, Saratoga, CA (US); Huahai Yang, San Jose, CA (US)

(73) Assignee: JUJI, INC., Saratoga, CA (US)

( * ) Notice: Subject to any disclaimer, the term of this patent is extended or adjusted under 35 U.S.C. 154(b) by 200 days.

(21) Appl. No.: 14/855,878

(22) Filed: Sep. 16, 2015

(65) Prior Publication Data
US 2017/0053558 A1  Feb. 23, 2017

Related U.S. Application Data

(60) Provisional application No. 62/208,381, filed on Aug. 21, 2015.

(51) Int. Cl.
   G09B 21/00 (2006.01)
   G09B 19/00 (2006.01)

(52) U.S. Cl.
   CPC ............. *G09B 21/00* (2013.01); *G09B 19/00* (2013.01); *G09B 19/0092* (2013.01)

(58) Field of Classification Search
   CPC .................................................... G09B 21/00
   USPC ........................................................ 434/236
   See application file for complete search history.

(56) References Cited

U.S. PATENT DOCUMENTS

| | | | |
|---|---|---|---|
| 9,070,088 B1 | 6/2015 | Baveja et al. | |
| 9,594,903 B1 | 3/2017 | L | |
| 2009/0132365 A1 | 5/2009 | Gruenhagen et al. | |
| 2010/0185520 A1 | 7/2010 | Gottfried | |
| 2011/0082770 A1* | 4/2011 | Krishnamoorthy | G06Q 30/0629 705/26.64 |
| 2011/0099191 A1 | 4/2011 | Ghosh et al. | |
| 2011/0212428 A1* | 9/2011 | Baker | G09B 5/00 434/308 |
| 2012/0041801 A1* | 2/2012 | Mascarenhas | G06Q 30/02 705/7.32 |
| 2013/0054366 A1* | 2/2013 | Roundtree | G06Q 30/0255 705/14.55 |
| 2013/0081036 A1 | 3/2013 | Cohen | |
| 2013/0086167 A1 | 4/2013 | Blom | |
| 2013/0268479 A1 | 10/2013 | Andler | |
| 2014/0337101 A1 | 11/2014 | Spears | |

(Continued)

OTHER PUBLICATIONS

International Search Report and Written Opinion dated Nov. 2, 2016 in International Application No. PCT/US2016/046563.

(Continued)

*Primary Examiner* — Thomas J Hong
(74) *Attorney, Agent, or Firm* — Pillsbury Winthrop Shaw Pittman LLP

(57) ABSTRACT

The present teaching relates to matching users with items. In one example, information related to one or more users is obtained from one or more sources including an online source. The information is transformed into one or more psychological needs of each user. One or more items are obtained. Each item is associated with abilities to satisfy one or more psychological needs. The one or more users are matched with the one or more items based on the users' psychological needs and the items' abilities to satisfy psychological needs to generate a matching result. The matching result is provided.

21 Claims, 21 Drawing Sheets

(56) References Cited

U.S. PATENT DOCUMENTS

2015/0248739 A1* 9/2015 Schulman .......... G06Q 50/2053
  434/322
2015/0254675 A1   9/2015 Kannan
2015/0293997 A1  10/2015 Smith

OTHER PUBLICATIONS

International Preliminary Report on Patentability dated Mar. 8, 2018 in International Application No. PCT/US2016/046563.
Office Action dated Oct. 1, 2018 in U.S. Appl. No. 14/855,764.
Office Action dated Nov. 15, 2018 in U.S. Appl. No. 14/855,836.
Office Action dated Jun. 15, 2018 in U.S. Appl. No. 14/855,836.
Office Action dated May 15, 2019 in U.S. Appl. No. 14/855,836.

* cited by examiner

METHOD AND SYSTEM FOR MATCHING PEOPLE WITH CHOICES

CROSS-REFERENCE TO RELATED APPLICATION

The present application claims priority to U.S. Provisional Patent Application No. 62/208,381, filed Aug. 21, 2015, entitled "METHOD AND SYSTEM FOR MATCHING PEOPLE WITH CHOICES," which is incorporated herein by reference in its entirety.

BACKGROUND

1. Technical Field

The present teaching relates to methods, systems, and programming for matching people with choices.

2. Discussion of Technical Background

People need and want different things for physical survival (e.g., food and water) or mental desires (e.g., respect and fame). With the advances of our society, on the other hand, more and more choices have become available, which may arouse new needs and wants of people. Although modern technologies, such as the Internet and the search engines, have helped people to fulfill their needs and wants, finding exactly what they need and want is still challenging. First, without properly labeled choices, it is difficult for people to find which choices, such as a product, a service, or a job position, satisfy their specific needs and wants. Second, a person may not know exactly what he/she wants thus is unable to articulate his/her needs and wants.

Existing approaches for helping people find what they want have many drawbacks. For example, using a user's search query to approximate the user's needs may not capture the user's true needs or deeper desires, because it is quite difficult for a person to find hotels that "make me feel prestigious" or dresses that "make me stand out and respectable." In another example, a collaborative filtering approach requires prior user behavior and does not work well in a situation where user behavior does not exist or is sparse.

Therefore, there is a need to develop techniques for matching people with choices to overcome the above challenges and drawbacks.

SUMMARY

The present teaching relates to methods, systems, and programming for matching people with choices.

A choice may refer to any item that is a product, a service, an opportunity. etc. The terms "choice" and "item" may be used interchangeably in the present teaching.

In one example, a method, implemented on a machine having at least one processor, storage, and a communication platform connected to a network for matching users with items is disclosed. Information related to one or more users is obtained from one or more sources including an online source. The information is transformed into one or more psychological needs of each user. One or more items are obtained. Each item is associated with abilities to satisfy one or more psychological needs. The one or more users are matched with the one or more items based on the users' psychological needs and the items' abilities to satisfy psychological needs to generate a matching result. The matching result is provided.

In a different example, a system having at least one processor, storage, and a communication platform connected to a network for matching users with items is disclosed. The system comprises a human needs establishment unit configured for obtaining, from one or more sources including an online source, information related to one or more users and transforming the information into one or more psychological needs of each user; a choice ability index establishment unit configured for obtaining one or more items, wherein each item is associated with abilities to satisfy one or more psychological needs; and a people-choices matching unit configured for matching the one or more users with the one or more items based on the users' psychological needs and the items' abilities to satisfy psychological needs to generate a matching result and providing the matching result.

Other concepts relate to software for implementing the present teaching on matching people with choices. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of matching people with choices. This present teaching discloses methods and systems for matching a person (or a group of people) with one choice (or a group of choices) based on the needs and wants of the people and the ability of the choices to satisfy such needs and wants. To understand human needs and wants, this present teaching first discloses methods that capture human needs and wants from various aspects and quantify such needs and wants such that human needs and wants can be interpreted more accurately. This present teaching further discloses methods that capture the essence of choices and index them by their abilities to satisfy specific human needs and wants. Based on the quantified human needs and wants and the ability indices of choices, the present teaching discloses how to effectively match the right people with the right choices such that the choices best satisfy the people's specific needs and wants.

The present teaching focuses on inferring and quantifying a person's particular needs and wants in various situations, while indexing every choice, e.g. a product, a service, an opportunity, and more, in terms of its capacity in satisfying specific human needs and wants. As a result, the solution in the present teaching may offer at least the following: understanding people's true needs and wants; predicting people's needs and wants as they evolve; understanding various existing choices and how they satisfy human needs and wants; predicting future choices based on the evolution of people's needs and wants; helping people better fulfill their explicit needs by finding what they want; helping people discover their own latent desires; and helping organizations position their offers (e.g., brands, products, and services) based on people's needs and wants, which helps them more easily find a target audience and satisfy such an audience.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

Figure 1:
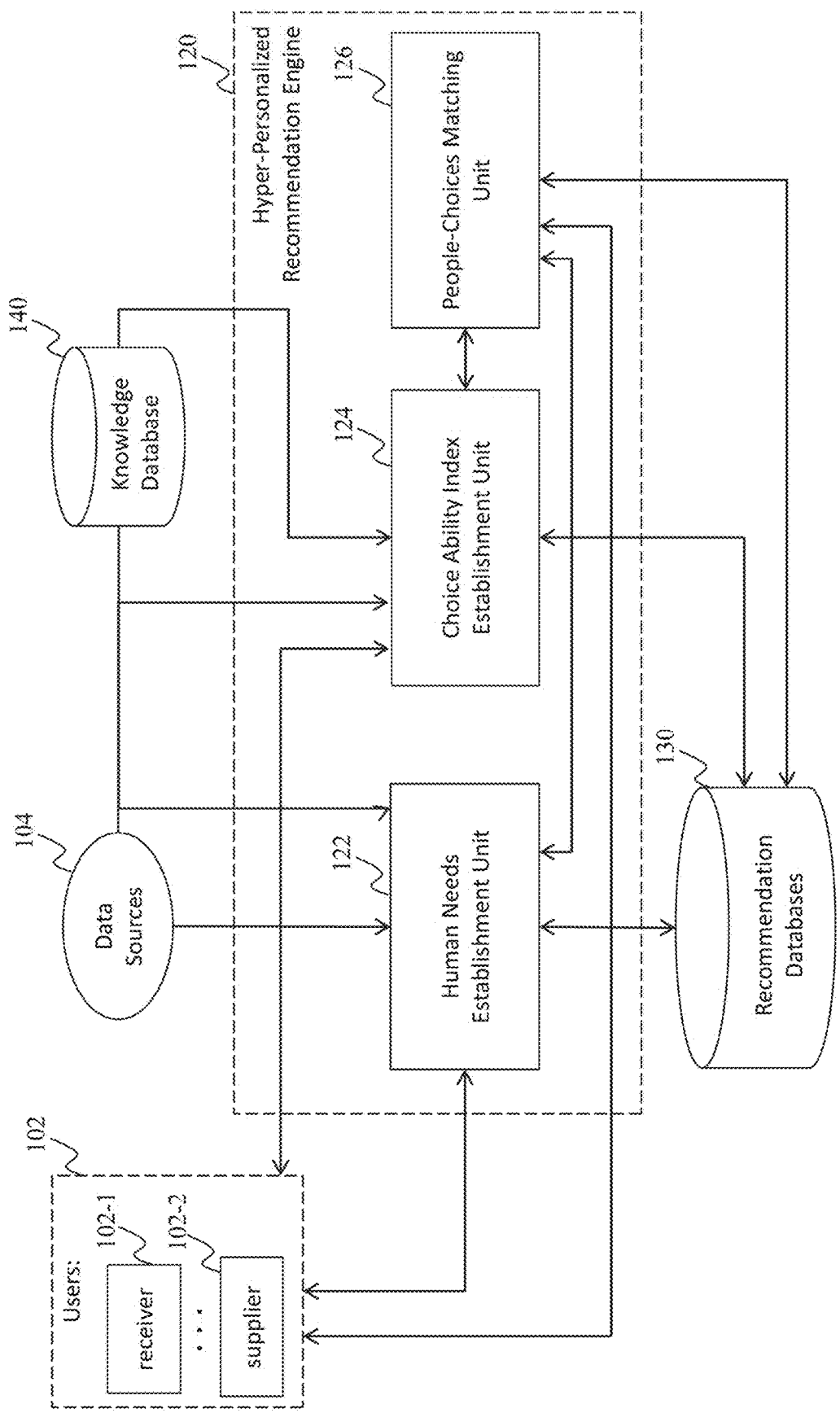
FIG. 1 illustrates an exemplary diagram of a hyper-personalized recommendation engine, according to an embodiment of the present teaching.

FIG. 1 illustrates an exemplary diagram of a hyper-personalized recommendation engine 120, according to an embodiment of the present teaching. FIG. 1 discloses an exemplary embodiment of the hyper-personalized recommendation engine (120) and its three key structural elements: (a) a human needs establishment unit 122 that determines a person's needs and wants, (b) a choice ability index establishment unit 124 that determines the ability index of a choice to satisfy one or more specific human needs, and (c) a people-choices matching unit 126 that dynamically matches people and choices based on people's needs and choices' ability to satisfy such needs. Since one or more units may be used alone or in combinations to facilitate hyper-personalized recommendations, FIG. 1 further discloses a number of exemplary utilities of the recommendation engine 120 as a whole or in one or more combinations of its components. Depending on the application of the engine 120, there may be one or more types of the users (102). One type of the users is receivers who receive recommended choices based on their needs and wants (102-1). Another type of the users is suppliers who may supply choices based on others' demands and/or receive recommended people for their supplied choices (102-2). There may also be other types of users, such as system administrators or third party service providers, who maintain and/or upgrade the functions of the engine.

One exemplary use of the engine 120 is for a receiver (102-1) to find things that satisfy his/her specific needs and wants, explicit or implicit. Module 122 is first called to derive the user's needs and wants. The matching unit (126) is then invoked to recommend choices that best satisfy the derived needs. In this case, the user may provide a set of needs-related information, which describes one or more aspects of his/her needs and wants explicitly or implicitly. It may also specify one or more data sources (104) that contain data to be used by the engine 120 to determine this user's true needs and wants. The derived needs are stored in recommendation databases (130). A slight exemplary variant of this use is when the matching unit (126) does find any desired matches based on the choices in the databases (130), it may then look for new choices that produce potential matches. In this case, module 124 may be invoked to determine the ability indices of the new choices.

Another exemplary use of the engine 120 is for a receiver (102-1) to subscribe to the recommendation engine where module 126 recommends suitable choices to the receiver perioridically (e.g., weekly or monthly) or by a pre-arranged setting (e.g., on major holidays only). Although the receiver may not state his/her explicit needs every time, module 122 may be called to refine or update the user's needs and wants.

Another exemeplary use of the engine 120 is for a supplier to find suitable people for their supplied choices. Module 124 is first called to establish the ability indices of these choices, and then module 126 is called to recommend suitable people whose needs are best matched with the choices offered. In this case, the user may provide a set of choice-related information, which may be used to determine the ability indices of the choices to satisfy one or more human needs. It may also specify one or more data sources (104) that contain data to be used by the engine 120 to determine the ability indices of the choices. The built ability indices are also stored in the databases (130). An exemplary variant of this use is where the matching unit (126) may not find any desired matches based on people in the databases (130), it may then look for new people who may produce potential matches. In this case, module 122 may be called to determined the needs and wants of the new found people.

Another exemplary use of the engine 120 is for a supplier (102-2) to subscribe to the engine 120 where module 126 recommends suitable people whose needs match with the ability indices of supplied choices periodically or by other pre-arranged settings. Although the supplier may not always offer new choices every time, module 124 may be called to update the ability indices of existing choices based on other information (e.g., the new customer experiences of the products).

Another exemplary use of the engine 120 is for a user such as a supplier of choices to establish and/or periodically update their understanding of relevant people's needs and wants via module 122. For example, a customer intelligence analyst may want to understand the needs and wants of their existing customers and how such needs and wants may have changed over time, while marketer may want to understand the needs and wants of target prospects. Likewise, an HR partner may want to understand the needs and wants of both new and existing employees. In such cases, the user may specify one or more data sources (104) that contain data to be used by the engine 120 to determine the relevant people's true needs and wants and how such needs and wants may have evolved. The new and/or updated human needs and wants are stored in the databases (130).

Another exemplary use of the engine 120 is for a user such as a supplier of choices to establish new and/or periodically update existing choice ability indices via module 124. For example, a product merchandiser may want to establish the ability indices of their new products to satisfy specific human demands and/or update the ability indices of existing products. Likewise, an HR partner may want to establish the ability indices of new job positions within the company and update the ability indices of existing positions. In such cases, the user may specify one or more data sources (104) that contain data to be used by the engine 120 to determine the relevant choices' ability indices. The new and/or updated choice ability indices are stored in the databases (130).

Figure 2:
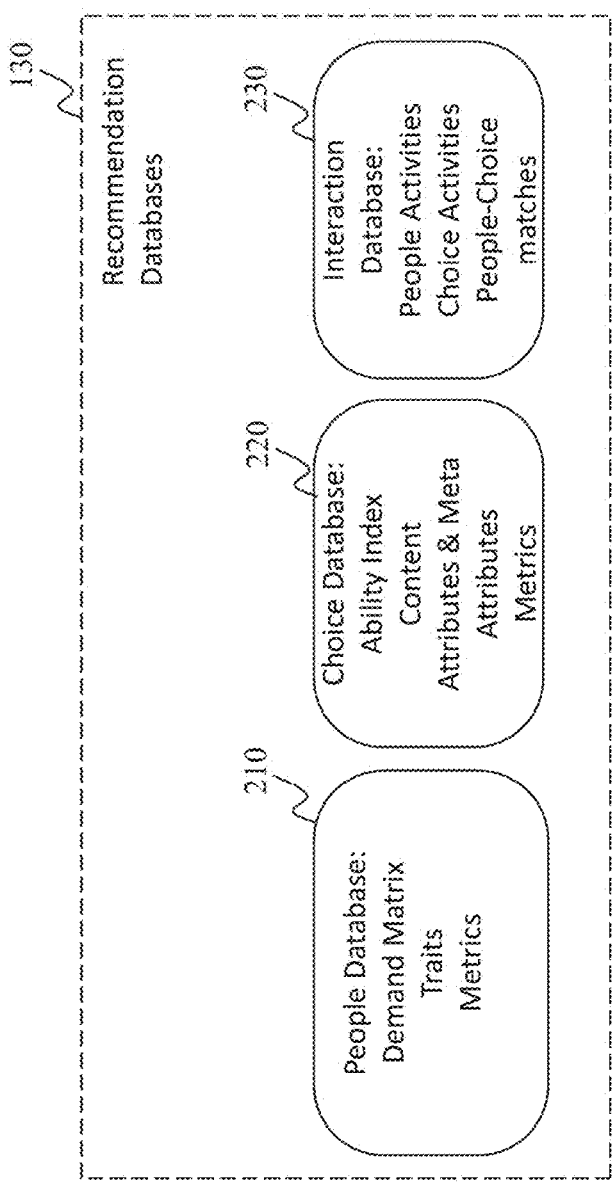
FIG. 2 illustrates content in recommendation databases, according to an embodiment of the present teaching.

FIG. 2 illustrates content in recommendation databases, according to an embodiment of the present teaching. As shown in FIG. 2, the recommendation databases (130) store different types of data. One type of people is about people, which is stored in the people database (210). It contains various types of information about people, such as the inferred human needs and wants and additional human traits, such as personality traits and demographics information. It also contains various metrics that measure various inferred information and its changes about a person, such as the confidence factor in the inferred needs and wants. Another type of information is about various choices, which is stored in the choice database (220). It stores various types of information related to the choices, such as the ability index of each choice as how it satisfies one or more specific human needs and wants, the content (description) of the choice, associated attributes (e.g., price) and meta properties of the choice (e.g., presentation of the choice), and metrics used to measure the analysis of the choice (e.g., the confidence factor in the derived ability index) and the changes in analysis results. Yet another type of data repository is an interaction database (230), which stores various user interactions, choice-related interactions, and people-choice matches that an application captures. For example, in an online retail application, consumers' interactions with the system, including their rejections and acceptances of recommended products and comments on the products, are all recorded in the interaction database.

Figure 3:
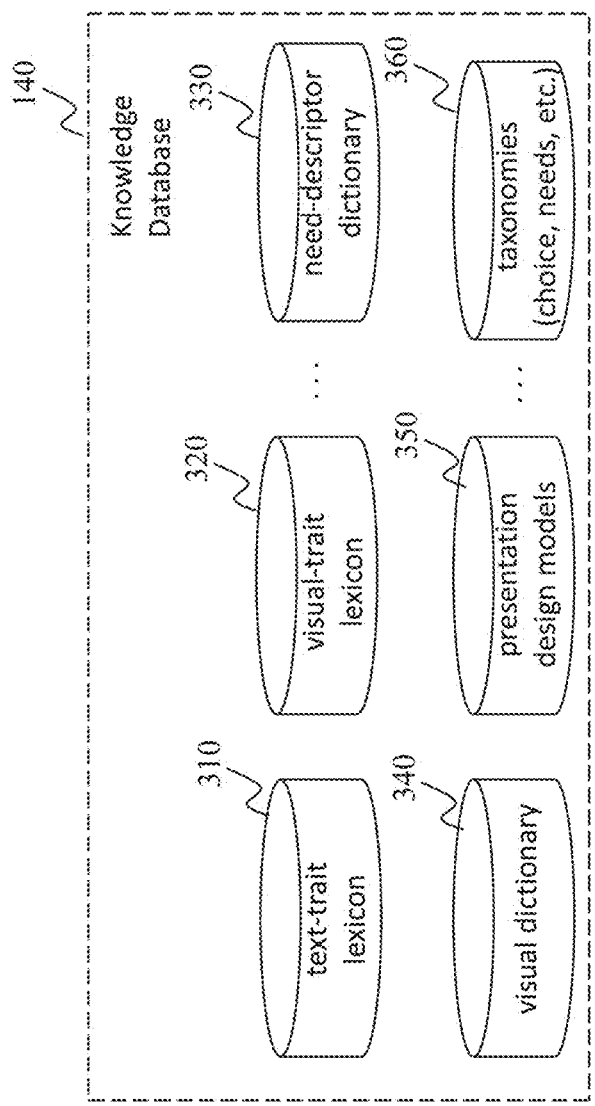
FIG. 3 illustrates content in a knowledge database, according to an embodiment of the present teaching.

FIG. 3 illustrates content in a knowledge database, according to an embodiment of the present teaching. As shown in FIG. 3, a knowledge base (140) is also used to supply various knowledge to make various computational inferences as described below.

Everyone has his/her own unique needs and wants and such needs and wants may evolve over time in one's life. Many models can be used for characterizing human needs, e.g. "system of needs" which identifies the needs for achievement and affiliation; "a hierarchy of human needs" from one's physiological needs to one's needs of being a better self. The hierarchy to characterize human needs may be from three aspects: the needs for existence, relatedness, and growth. Needs may also be further refined into various intermediate needs. Among these different frameworks, human needs are recognized with varying levels of importance. For example, there are "needs" necessary for survival (e.g., food and water), where others are simply "wants" that a person would like to have (e.g., being famous). Besides varying with different levels of importance, human needs are often context sensitive. For example, human needs may be characterized differently in a commercial context compared to a professional context. Human needs may also be influenced by many other factors, such as one's age and cultural background. Furthermore, human needs and wants may be explicitly specified by a person or are latent. For example, a person may desire to be wanted by others but may have not spoken about nor been aware of such a desire.

To capture one's needs and wants more accurately from various aspects, the present teaching defines a demand matrix for each person, where each row captures a specific demand of the person, and each column represents one or more properties/meta properties of the demand. These properties describe a demand from one or more aspects, such as the explicit request, implicit needs, importance of the demand, the type of the demand (e.g., physiological demand for the purpose of human existence or psychological demand for personal growth based on the needs hierarchy), the source of the demand (e.g., explicitly requested by a user or implicitly inferred), lifetime of the demand (e.g., is this a short-lived demand or a lasting one), urgency of the demand (e.g., how urgent is the demand), frequency of the demand (how often such a demand may be raised), status of the demand (e.g., fulfilled, unfulfilled, or recommended), and the potential cost to fulfill the demand. It may be also associated with one or more meta properties, such as a confidence factor, which indicates how confident the system is about the captured demand. Depending on the applications, the description of the demand may be quite different and context-specific. For example, in an c-commerce application where the description of a demand may capture a consumer's desire of purchasing a particular type of product and his/her preferred price range of the product. On the other hand, in a job marketplace where the description of a demand may capture a job seeker's desire of obtaining a particular type of job along with the preferred work location and salary of such a job.

While the explicit request captures the concrete "things" that a person is asking for, the implicit needs capture the underlying latent desires of the person. For example, a person may request of finding a software engineer job with his implicit needs of wanting to work in a friendly, collaborative instead of a competitive environment. Similarly, a consumer may explicitly state her request of finding a summer dress with her latent desires of looking sophisticated but natural. While it is relatively easy for a user to express an explicit request, it is often not easy for him/her to specify his/her implicit needs for a couple of reasons. One reason may be that the user simply does not know his latent desires. Another one may be that the user does not know how to articulate his/her implicit needs so that the underlying system could understand. As seen below, a goal of this present teaching is to determine one's latent desires automatically from one or more data sources.

Figure 4:
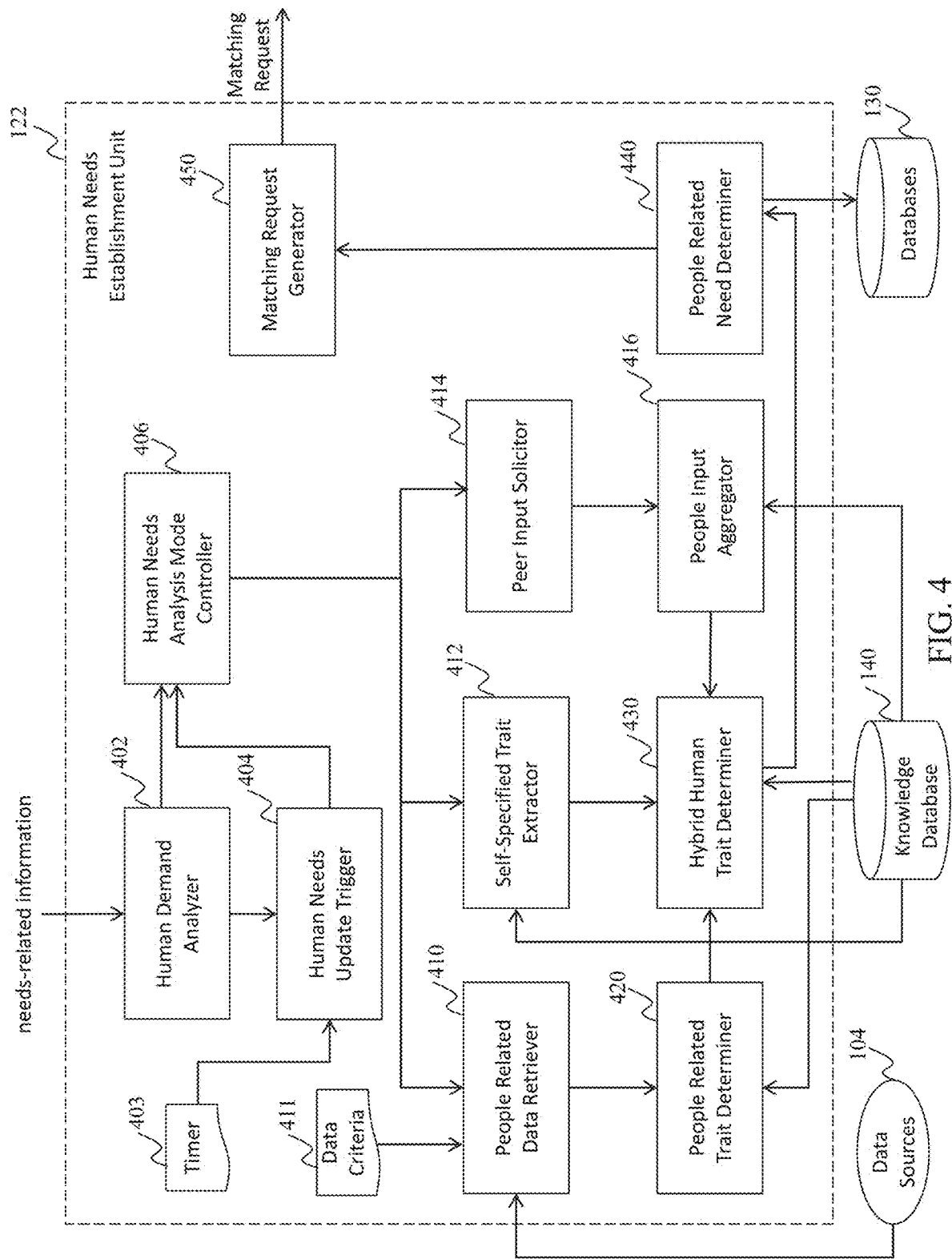
FIG. 4 illustrates an exemplary diagram of a human needs establishment unit, according to an embodiment of the present teaching.

FIG. 4 illustrates an exemplary diagram of a human needs establishment unit 122, according to an embodiment of the present teaching. As shown in FIG. 4, the input to module 122 is a person's needs-related information. The information may be input by a user him/herself or by a third party (e.g., a friend) via one or more computer interfaces, such as a Google search like interface, a GUI, a speech interface, or a combination of them. The information may also be automatically formulated by another system module (e.g., module 126) to determine the needs for a particular person. Here are several examples of a person's needs-related information:

Example 1: {<"person": "@twitterMe"><"search query": "shirts">, <"importance: 0.5"><"task": "new-demand">}

This example indicates that this is a new demand from a person whose Twitter id (screen name) is @twitterme. This includes a search query for "shirts" and importance of the request is 0.5.

Example 2: {<"user-id": "jsmith"><"task": ["update-needs", "find-matches"]>})

In this example, only the user-id is specified and the first task is to update the needs for this id, and the second task is to find the matches for this user based on his/her needs.

A person's needs-related information is first sent to the human demand analyzer (402). The analyzer parses the input and checks whether this is to derive the needs for a new demand (e.g., Example 1). If this is an update (e.g., Example 2) with a specified time, it checks the update trigger (404), which is associated with a timer (403). No matter whether it is to infer the needs information about a new demand or to update the needs of a person, the input is routed to the controller (406) for further processing. If this is to infer needs about a new demand, an empty demand vector (a row of a demand matrix described above) is first created and its explicit request slot is often filled with the information from the input, such as the user search query in Example 1 above. As seen above, a person's needs-related information is often vague and incomplete (what type of shirts does she want?), missing critical information, such as the underlying latent desires. Thus the controller calls the appropriate modules to determine the missing information using one or more methods described below. Likewise, if this is a request to update existing needs/demands of relevant people, the controller checks the input to see what is to be updated and then makes the updates accordingly using one or more methods described below.

As many of a person's needs and wants are psychological needs, these needs and wants are often highly correlated with this person's psychological traits, such as personality. Thus, a person's traits may be used as an important clue to infer one's needs. One's traits may be inferred from one or more data sources.

One data source to determine a person's traits is based on the person's self-reported traits (412). Such traits may be obtained by asking the user to take a psychometric survey, like the Big 5 personality test. Instead of taking a psychometric survey, a user may also describe his/her own traits in one or more keywords, similar to those appearing in a profile, e.g., goal-oriented, collaborative, and diligent. These keywords can be converted into one or more human traits that a system can understand and further process. A simplest approach is to use a trait-descriptor dictionary (FIG. 3, 330), where each human trait corresponds to one or more keyword descriptor. Based on this dictionary, one or more keywords are then matched to one or more human traits. No matter which method is used, module 412 extracts a set of self-reported human traits.

Since it is well known that a human being may be inconsistent or not completely truthful in taking a survey or may not know him/herself well enough, in such cases, an alternative approach is to automatically infer a person's traits from one's own behavioral data, including but not limited to one's write-ups, photos, likes, and sharing activities. Since a person may generate much behavioral data in different contexts and one's needs and wants are often context-sensitive, module 410 is called to select and retrieve the suitable data to use by one or more criteria (411), such as data quality and context relevance. Once the data sources are selected and relevant data are retrieved, the trait determiner (420) is called to automatically infer a set of human traits. If multiple data sources are used, the trait determiner also consolidates the traits derived from one's different data sources.

Since one's behavioral data may be limited or biased, additional data sources may be used to infer one's needs. One such data source is peer input where peers comment on the traits of a person. This step includes two key sub-steps: peer input solicitation (414) and peer input aggregation (416). Unlike existing peer endorsement (e.g., LinkedIn) methods, which normally asks a peer to select from a pre-defined list of endorsement items (e.g., LinkedIn skill items and the trait items that an endorser may or may not understand, this present teaching reveals a more flexible and effective tag-based approach that gather peer input in context. Moreover, when aggregating peer input together, it also takes into account a number of factors including the traits of the endorser that has been rarely considered to make the results more accurate. The module 414 is called to solicit a peer's input on one or more traits of this person. This module also translates often free-formed user input into system-recognizable human traits. However, human endorsements may not always produce consistent or even meaningful results. For example, one may receive multiple endorsements on one trait from the same peer but with different scores, or from multiple endorsers with different scores. On the other hand, a person may receive just a single endorsement on a trait. Thus, module 416 is called to consolidate redundant, inconsistent endorsements and discard insignificant ones.

No matter which data sources are used to derive a person's human traits, all derived traits are then sent to the hybrid trait determiner (430) to produce a set of consolidated human traits. In the case where the task is to update existing human needs, the trait determiner also consolidates the traits derived from new/updated data sources with that already stored in the databases to update all relevant human traits.

The fully updated, integrated traits are then sent to the needs determiner to infer the missing information in a human demand (440). If the input also requests suitable matches for the person under concern, module 450 also generates a matching request, which is then sent to the matching unit (126). The enriched demands are stored in the databases (130). In this configuration, several components, including modules 412, 420, and 430, may use the knowledge base (140) to make respective inferences.

Figure 5:
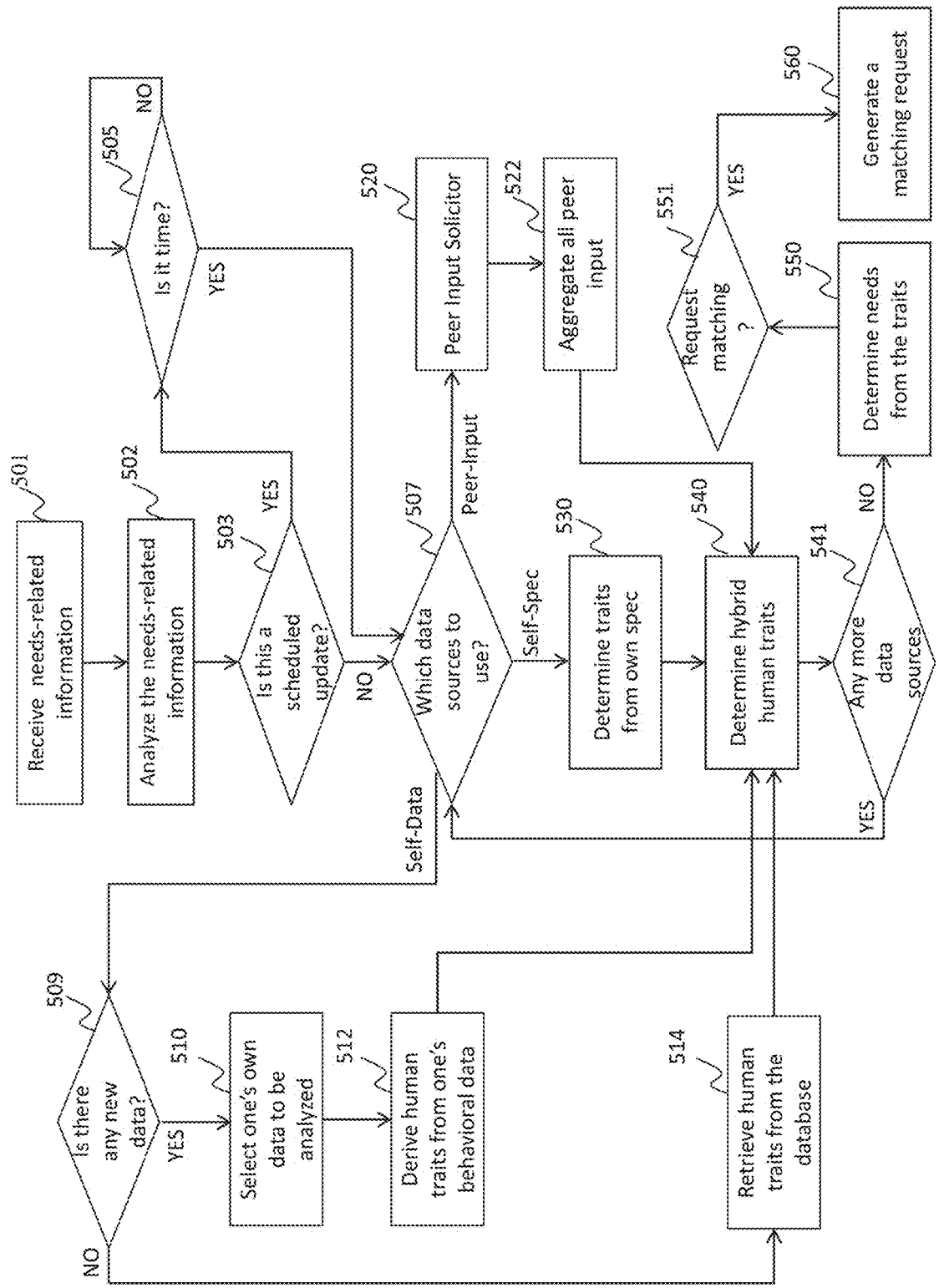
FIG. 5 shows a flowchart of an exemplary process performed by a human needs establishment unit, according to an embodiment of the present teaching.

FIG. 5 shows a flowchart of an exemplary process performed by a human needs establishment unit, e.g. the human needs establishment unit 122 in FIG. 4, the according to an embodiment of the present teaching. As shown in FIG. 5, the process flow of determining a person's needs starts with receiving at 501 one or more pieces of needs-related information, which often specifies a human demand at a rather high level Such an input is first analyzed at 502. If this requests a scheduled update on the existing needs of one or more people at 503, it then checks whether now it is the scheduled time at 505. If it is, it proceeds to check the type of update needed 507. If it is not, it may wait for a time period to check again. If the request is to figure or enrich a human demand, it also proceeds to check which data to be used to do so at 507.

If it is to use one's own specified traits, as described above, the method is rather straightforward as it may ask the user to input one or more keywords to describe him/herself or take a psychometric survey at 530.

The process also checks whether one's own behavioral data is new or has changed since it was analyzed last time at 509. If there is no new data for analysis, it basically retrieves at 514 the previously derived traits from the databases 130. Otherwise, the new or updated behavioral data are processed at 510.

Since a person's behavior may be captured in one or more data sources, this step 510 is to choose which data to use for deriving one's traits. A simplest approach is by data availability: using whatever available data sources provided by a user. If two or more data sources are provided (e.g., Facebook and Twitter), the data from these sources may be simply combined for analysis. To ensure the integrity and quality of operations, most preferably, this step should select only suitable data sources to use. First, different applications require different data. Assuming that the underlying application is an online marketplace for job seekers, LinkedIn and Twitter may be the more desired data sources as they often reflect people's professional life. In contrast, if the marketplace is for fashion, Facebook, Instagram, or Pinterest may be the more suitable sources. Moreover, data quality may vary in different sources, which directly impacts the quality of human traits derived. Data quality may be determined by one or more criteria, such as density (how much behavior is exhibited), distribution (all the behavior occurs at once or distributed over a long period of time), and diversity (how diverse the captured behavior is).

By the data selection criteria, one of many methods or in their combination may be used to determine the data sources. One exemplary method is to first let a user interactively specify one or more data sources to use, which provides the user with certain freedom to decide which aspects of his/her life to be analyzed and exposed. The system then evaluates the user-volunteered data sources and decides which ones to use by the selection criteria. Another exemplary method is to let a system selects one or more data sources qualified by a set of criteria, and then prompts a user to provide the data (e.g., via Facebook login). In this approach, all possible data sources are stored in a knowledge base and associated with a set of descriptors in a format similar to: <Facebook, personal, 0.8>, <LinkedIn, professional, 0.5>, . . . .

This format means that Facebook may be a good data source to use if it will be used to characterize one's personal aspects and the quality of one's Facebook exceeds 0.8; otherwise, LinkedIn may be a better one if this for professional purpose and the estimated data quality exceeds 0.5.

After determining what data to use, the next step 512 is to derive a person's traits from the data. Normally there is a set of basic human traits, such as one's personality, to be determined regardless the application. However, higher-level traits are often determined by a specific application. For example, an c-commerce application cares more about one's traits that characterize the person as a consumer, while a job-seeking application is concerned more about one's traits that characterize one's professional aspects. Depending on the type of data (e.g., likes vs. write-ups) and the type of traits to be derived, different trait engines may be used.

One exemplary trait engine is to use a lexicon-based approach to analyze textual data and derive basic human traits. Associated with such an engine, a text-trait lexicon (310) is first constructed to indicate the weighted relationship between a word, such as "deck", and a particular trait, e.g., conscientiousness, with a weight, say 0.18. Such a text-trait lexicon may be constructed based on relationships between words and human traits. The trait engine then takes a person's textual footprints (e.g., reviews, blogs, and emails) and counts the frequencies of each word appearing in the trait lexicon. The counts are often normalized to handle text input with different lengths. For each trait t, it then computes an overall score S by taking into account all M words that have relationships with t in the lexicon:

$$S(t)=C(word_1)*w_1+C(word_2)*w_2+ \ldots +C(word_M)*w_M \quad (1)$$

Here $C(word_i)$ is the normalized count of word in the input and $w_i$ is its weight associated with trait t.

Another exemplary trait engine is a rule-based engine that takes one or more basic traits to produce one or more composite traits. Associated with such a trait engine is a set of trait composition rules, where each rule specifies the following:

$$S(ct)=S(t_J)*w_J+ \ldots S(t_K)*w_K \quad (2)$$

Here S( ) is a score, ct is a composite trait, consisting of K basic traits, $t_1, \ldots r_K$; and $w_J, \ldots w_K$ are the weights, respectively. A trait engine described above may be used to compute the score of a basic trait (Formula (1)), and the associated weight may be determined empirically. For example, composite trait diligence is related to basic traits, self-discipline (positive), achievement striving (positive), and agreeableness (negative). In this case, embodiments of the present teaching may assign equal weights 1, 1, and −1 for the three basic trait components.

Such composition and weights may also be trained automatically. Specifically, embodiments of the present teaching first construct a set of positive and negative examples. Specifically, each positive example represents a diligent person characterized by his/her derived basic trait scores and a label indicating his/her diligence (e.g., diligence=1). On the opposite, a negative example represents a not-so-diligent person characterized by his/her derived basic trait scores and a label indicating a lack of diligence (e.g., diligence=0). These examples are then used to train a statistical model and infer the weights (contributions) of various basic traits to this composite trait. The inferred weighs then may be used to compute the score of a composite trait.

Just like any other data analysis engines, the quality of the data or the analytic algorithms themselves is hardly perfect. To assess the quality of a derived trait score, quality metrics are also computed. There are may be two most important quality metrics in deriving a human trait score: reliability and validity. Reliability measures how consistent or stable the derived results are, while validity evaluates the correctness or accuracy of the derived results. There are many ways to compute the reliability. One exemplary implementation of computing reliability is to use each person's different sample data sets (e.g., random samples of one's all Facebook status updates) to derive the trait scores and examine how stable the results are. Although there are many methods for measuring validity, validating the correctness of the results takes time. For example, assessing whether a person is actually responsible, real-world evidence is needed. In a specific application, one method is to log a user's behavior (e.g., always finishes a task on time) that may be used as a positive or negative evidence to validate one or more traits (e.g., responsible). Over time, a validity score may be computed based on the prediction power of a trait on the corresponding behavior.

As described above, one or more data sources may be used in deriving one's human traits. Moreover, one or more types of data may exist in a single data source, each of which may be used to derive a set of traits. For example, one's Facebook data source may include three types of data; likes, status updates, and profile. One can derive Big 5 personality traits from likes, social behavior, a profile, or one's status updates. This step 512 thus also consolidates derived traits together based on one or more criteria, such as data type, data source, trait type, and trait quality.

One exemplary implementation is to consolidate the same type of traits derived from different types of data (e.g., Facebook likes and status updates) in a single data source (e.g., Facebook) by taking the mean or average of the trait scores if the scores are similar enough. However, if the differences among the scores are too great (e.g., exceeding 3× standard deviation), the confidence score associated with each trait may be used to determine which ones to keep since such confidence score measures the quality of a computed trait score. Another exemplary method is to preserve trait scores by data sources. Suppose that a set of traits $<t_1, \ldots t_K>$ is derived from Facebook, while another set $<t'_1, \ldots t'_K>$ is derived from Twitter. The consolidation keeps the dominate traits (max or min scores) derived from Facebook data if the traits characterize one's personal side (e.g., social and emotional characteristics), while keeping the dominate traits derived from Twitter if the traits describe one's professional aspect (e.g., hardworking and ambitious). The trait type may be determined in advance and stored in the knowledge base to indicate what life aspects a trait describes, and a trait (e.g., conscientiousness) may describe multiple aspects of one's life. In such a case, trait scores derived from different data sources may be preserved unless the data sources are considered similar (e.g., Pinterest and Instagram). This is because a trait may be context-sensitive (e.g., a person may be high in conscientiousness in one's professional life but much less so in the personal life) so embodiments of the present teaching want to preserve the different scores to reflect this person's different character in different contexts.

After the consolidation, if a person is still associated with two or more sets of derived traits, this step then designates one set as the primary trait set based on the specific application. For example, if the underlying application is an online fashion commerce site, one's primary trait set is most likely the one derived from Facebook, while the primary trait set is most likely derived from LinkedIn for an online job marketplace.

The determined human traits are then sent to an aggregator for further process at 540. In the current flow, it checks whether there are other data sources to be used to derive one's traits at 541. If there is, it checks which data source is to be used at 507. It repeats this process until there is no additional data source.

If peer input is one of the data sources to be used for deriving a person's traits, this step 520 solicits a peer's input on one or more traits of a target person. Instead of pre-defining a long list of traits and then asking a peer to vote on, a more flexible and effective approach is to let a peer input text tags to describe one's traits in context. One exemplary implementation is to prompt person A to tag person B when A is reading B's comments. To further aid peer input, frequently used, user-generated tags may be suggested when a peer is entering his/her own tags. Another exemplary implementation is to prompt person A with a question, such as "name the top 3 most diligent people you know". As a result, the three people will be tagged with "diligent". In addition to entering a tag, a more preferable approach is to let one also enter a score with the tag to indicate the strength of the underlying trait, e.g., <diligent, 0.5>.

Since a tag is basically one or two keywords given by a person to describe a trait, it needs to be associated with the underlying trait. To associate a tag with a trait, in most cases the process is straightforward, since a tag may be directly associated with a human trait by looking up in a trait-text lexicon in the knowledge base. This lexicon associates each trait with one or more word descriptors. In case where a direct mapping does not exist, the tag may be expanded into a set of tags to include its synonyms. The lookup is then performed again to find an association. In the worst case, a human (e.g., a user or a system admin) may be involved to manually associate a tag with a trait.

The output of the last step 520 is one or more traits along with their scores (if scores are not specified by an endorser, by default it is 1) given by one or more endorsers to a person: $\{ \ldots, <t_i, s_i, e_j>, \ldots \}$, where $t_i$ is an endorsed trait, $s_i$ is trait score, and $e_j$ is the endorser.

While methods such as a simple voting method may be used, i.e., choosing the trait and its score that have been endorsed the most of times, a proposed method here is to assess the weight of each endorsement based on one or more factors, such as the endorser's relationship with the person or the endorser's activeness. However, one factor that is rarely used is the character of the endorsers themselves, since existing systems are not able to obtain such information. Since the step 512 is to extract one's human traits including an endorser's traits, one exemplary implementation in to use the character of an endorser for weight determination. This implementation assigns a higher weight to an endorsed trait if the trait belongs to a specific trait type and the endorser him/herself also scores high on the same trait. Here each trait is associated with a trait type in the trait lexicon in the knowledge database 140. For example, traits like fairness belonging to a type that embodiments of the present teaching call liable traits, indicate how responsible a person is, which in turn renders his/her endorsement more reliable and trustworthy. In another example, trait such as methodical belong to another type embodiments of the present teaching call big-ticket traits, indicate that these traits are hard to "earn". If someone who already possess hard-to-earn traits have endorsed others on the similar traits, it makes such an endorsement harder to earn and more trustworthy.

Once the weight of each endorsed trait is determined, one or more methods may be used to consolidate redundant and/or inconsistent endorsements. One exemplary consolidation is to use a weighted linear combination, while another is to choose the one with the biggest weight. The weights may also be used to determine whether an endorsement is insignificant and should be discarded at the current time (e.g., the weigh is below a threshold). This is especially useful for judging a trait that has received only one or two endorsements, where the endorsers' character may largely determine the significance of their endorsements.

The aggregated peer input is then sent to the trait aggregator for further processing at 530. At this point, if no more additional data source is to be processed, the process moves forward to 550 to determine the human demand from the derived human traits at 540. If the original input also contains a request to find matching choices for the specified demand at 551, a matching request is then generated at 560.

The step 540 is to integrate the two or more sets of human traits derived from one or more data sources. For example, at 512 one set of human traits may be derived from one's own behavioral data, at 522 one or more human traits may be produced from peer input, and at 530 a set of self-reported traits may be gathered. Moreover, when updating one or more people's existing needs, the derived traits may also need to be integrated with those already stored in the databases. To integrate two or more sets of traits, our approach described below merges two sets of traits at a time, and is then repeated until all sets are merged.

Although there are many simple implementations to integrate two trait sets together, a preferred implementation is to use the quality of derived traits to guide the integration and resolve conflicts. One such exemplary implementation starts with the set that has a smaller number of traits derived and integrates each trait in this set into the bigger set. When integrating trait $t_s$ in the smaller set into the bigger set, there are two situations: (i) if there is no corresponding trait $t_b$ in the bigger set add $t_s$ into the bigger set; (ii) otherwise, integrate $t_s$ and $t_b$. In their integration, if these two traits have similar scores (e.g., within a threshold), an average of the two may be used. On the other hand, if the disparity between the two trait scores is too big (e.g., exceeding 3× standard deviation), it then checks the confidence score associated with each trait score. For data-derived traits, the confidence score may be its reliability score or validity score (if exists) explained in 512, while for peer-endorsed traits, the confidence score is the computed weight explained in 522. If only one of the confidence score exceeds a threshold, its related trait score is then kept. However, if both confidence scores are either below or above the threshold, both trait scores are kept but with a conflicting flag attached. A conflict flag will not be taken down until the conflicts are resolved, e.g., trait scores or their associated confidence scores are changed in the future due to new input, such as new peer endorsements. Since it is difficult to judge the confidence factor of a self-reported trait, self-reported traits may be used as an "arbitrator" for conflict resolution. For example, if there is a conflict flag and the self-reported trait (often associated with a default score) sides with the one derived from peer input, the trait score then derived from the peer input may then be used and the conflict flag may be taken down.

Composite traits are made up of one or more basic traits and their trait scores are updated accordingly if any of the related basic trait scores is changed due to the integration such as the described above. For example, initially a person's trait self-discipline derived from his own data (or perhaps due to a lack of data) is low. However, via peer endorsements, the person obtained a high self-discipline score, which also comes with a high confidence (weight). During the integration, the high score is then used. Any composite traits, such as toughness, which used the previous lower score, are also updated accordingly.

As mentioned earlier, a demand matrix is used to capture the demands of a person from various aspects of his/her life accurately and comprehensively. Each row of the matrix represents a demand and each column represents a property of the demand. Here, in embodiments of the present teaching, a user demand is created one at a time, which corresponds to one row in the matrix. As described earlier, such a demand is often partially specified or vague. The step 550 is to complete the demand by inferring the missing information. In cases where a user may specify a "compound" demand, such as "finding flights and hotels", such a compound demand may be split into two demands, one for "finding flights", and the other for "finding hotels". This step is then to determine the missing information for each of the demands.

To encode implicit human desires, a taxonomy of human needs is first created. Such a taxonomy may be built on needs or motivation theories in Psychology. Built by taking into account multiple needs theories, below is an exemplary needs taxonomy that focuses on characterizing a set of most basic human psychological needs. The order by which the needs are listed and the curly braces indicate a hierarchy of needs.

Safety & Security: {Physical safety; Financial security; Consistency in others; Comfort}

Relatedness: {Love; Empathy; Intimacy; Affiliation}

Esteem: {{Respect from others: {Status; Recognition; Fame; Prestige; Attention; Acceptance; Control (Power))}}; (Self esteem: {Confidence; Competence; Autonomy; Self Expression}}}

Self Growth: {Consistency in oneself; Stimulation (Excitement); Novelty; Altruism; Spirituality}

Although this exemplary taxonomy is quite comprehensive in representing various basic human needs, by no means it is complete. Nonetheless, it serves as an adequate exemplary representation framework for computing human needs.

Assume that on the surface, one's demand is to buy a dress with the underlying desire for gaining respect from others, in particular, Acceptance and Attention. In this case, such desires may be captured using the taxonomy as:

Example A: <"Explicit request": "dress"><"Implicit needs": [("Acceptance", 0.6, 0.7), ("Attention", 0.78, 0.9)]><"Type": "Esteem">

Here the first score (e.g., 0.6 and 0.78) associated with a need indicates the strength of the need-how strong the desire might be, while the second score (e.g., 0.7 and 0.9) indicates the confidence about the derived needs. One or both scores may be absent, indicating the default setting with the strongest strength (1.0) and confidence (1.0).

In contrast, the same demand of buying a dress may be associated with an implicit desire for self expression instead of gaining respect from others. Such a demand may be represented based on the taxonomy as follows:

Example B: <"Explicit request":"dress"><"Implicit needs":("Self expression")><"Type": "Esteem">

Note that here the type of the needs is also encoded because it may be used to prioritize the satisfaction of needs, since Maslow pointed out that people are keen on satisfying their lower needs (e.g., Safety) before fulfilling their higher level needs (e.g., Growth).

Figure 13:
FIG. 13 illustrates an exemplary survey, according to an embodiment of the present teaching.

As mentioned earlier, the main task of this step is to automatically infer the implicit needs as shown above. Since people's traits and their psychological needs are highly correlated, human traits such those derived at 512 are used to infer the corresponding needs. One or more approaches may be used to perform such inferences. One exemplary approach is to use a statistical machine learning approach that automatically learns the relationships between one's traits and his corresponding psychological needs. To do so, the first step is to obtain a set of training data. The training data may be obtained by conducting a psychometric survey that solicits people's needs explicitly. An exemplary survey is shown in FIG. 13. Using the inferred traits of the survey participants (inferred by step 512) along with their survey results, a set of training examples is constructed. A training example is similar to the following:

$T_1, \ldots T_K, N_1, \ldots N_M$, where $T_i$ (i=1, K) is a human trait score, K is the total number of human traits derived, $N_j$ (j=1, M) is a need score, M is the total number of needs.

Using the training data, a statistical model may be trained to capture the relationship between the human traits and the needs. Now given a new person and his trait scores, the trained model infers his implicit needs based on his traits.

To infer people's needs in a specific context/domain, a domain-specific needs surveys instead of a basic needs survey as shown above may be used. For example, in a fashion domain, fashion style needs surveys or the fashion style quiz survey may be used. Note that these surveys are different from the surveys asking about users' product preferences on one or more product features, such as its price or packaging. Instead, these surveys capture one's style need from a psychological perspective. In other words, these styles need represent the psychological needs of people in the fashion context. For example, a person with a style need of free style corresponds to one's psychological needs of self-expression, while a style need of dramatic matches the psychological need of wanting attention.

Using the same approach as described above, a style need prediction model may be built to predict one's style needs given his/her traits. A domain-specific need may be considered a direct mapping or a composition of basic human needs as those described in the taxonomy. Such mapping may be defined by rules in advance. For example, a rule defines that "dramatic" style need maps onto the "Attention" need in the taxonomy: "Dramatic"→"Respect from Others"% "Attention". Using such a mapping, both the domain-specific and basic needs are then captured in a human demand. Using the above example, a person wants a dress with an implicit desire of wanting something dramatic may be represented as:

Example C: <"Explicit request": "dress"><"Implicit needs": ("Attention", 0.8, 0.75)><"Type": "Dramatic">

In the above example, while the field "Explicit request" may be specified by a user, the field "Implicit needs" is automatically inferred by the system based on the user's traits as described above. Although inferring basic human needs may be adequate in helping people find what they want in many situations, the ability of understanding one's domain-specific needs has its added benefits. Not only such needs capture one's demands more accurately in a specific context, as will be seen later, it is more effective in identifying matched products that satisfy particular domain-specific needs, as the products are often designed to target such domain-specific needs.

It may be worth pointing out that an alternative embodiment of above approach may directly infer one's implicit desires from one's own behavioral data (retrieved at 510). Instead of training a statistical model using one's traits (derived from 540) and one's needs scores (e.g., obtained from a needs survey), it trains a model using one's behavioral data, such as ones' write ups and images, and their needs scores.

One implementation of such an approach is described by Yang and Li in their work on deriving universal needs from one's social media data. However, such an approach has several drawbacks. First, one's raw behavioral data may produce a much larger feature space, including high-dimensional text features and image features, than using one's trait data that often includes a much smaller number of traits. A large feature space also makes the model construction (training) much more difficult and time consuming. Careful feature selection may be needed to reduce the number of dimensions in order to produce an effective prediction model. Second, a larger feature space requires larger quantities of training data, which may not be available. Third, there is little research on which types of human behavioral data may be used effectively to automatically infer one's needs, while one's traits may be effectively derived from many types of behavioral data, including simple behavior such as Facebook likes. Furthermore, previous studies have shown that one's traits are highly related with one's needs. Hence, the exemplary implementation described earlier by using one's traits to derive one's needs may be a more effective approach.

Other properties of a human demand, such as importance and frequency, may be derived using one or more approaches. For example, the frequency of a demand may be estimated based on user behavior or set by one or more rules (e.g., needing car every 10 years), while the importance may be set by default initially and changed by users later. The default setting may be based on the type of need, e.g., satisfying one's lower level needs is more important than the higher level needs. Similarly, the urgency of a demand may be specified by a user or inferred by one or more rules (e.g., the need of food and water may be more urgent than buying a dress). As will be seen later, all these properties are used to help people find exactly what they want.

As a result, a human demand is characterized by at least one or more properties: Explicit request; Implicit needs; Source; Status; Importance; Urgency; Frequency . . . .

Studies in various fields, from consumer research to organizational psychology, have shown that it is the human needs and wants that drive people's behavior and decision making in the real world, no matter whether they are making a purchasing decision, choosing a brand to follow, or accepting a job offer. Thus, human needs and wants are examples of demands in this world, which create many choices to satisfy different human needs and wants. Here the term choice refers to anything that is created to satisfy one or more human needs and wants, or human demands for simplicity. For example, a choice may be a brand such as Nike, a product such as a particular dress, a service like a banking service, a job, or even an educational opportunity (e.g., being accepted by a Law School). Since a choice is designated to fulfill one or more human demands, embodiments of the present teaching index each choice by its ability to satisfy one or more specific human demands. For example, a brand like Harley-Davidson possesses a "rebel" persona that is intended to fulfill the human demand of being free and being cool. In contrast, a brand like Hallmark embodies a "lover" persona with a charming, sincere personality, aiming at satisfying the human desire of being social and affiliated. Similar to a brand, an actual produce/service or a job is meant to satisfy specific human needs. For example, a dress may be made to satisfy one's desire to stand out and be comfortable at the same time; while a particular job position fulfills one's desire to be connected and powerful.

To better match human needs and available choices, embodiments of the present teaching thus label each choice with a Human Need Satisfaction Index (HNSI) that specifies one or more needs that the choice satisfies. Formally, HNSI of a choice (c) may be represented by a vector that consists of one or more tuples:

$HNSI(c)=\{ \ldots <n_i, s_i, f_i> \ldots \}$, where $n_i$ is the ith human need that c satisfies, $s_i$ is a numerical or nominal value that measures the choice's ability to satisfy the need, and $f_i$ indicating the confidence factor about the derived $s_i$. $f_i$ is optional if it is absent, it implies the confidence is 1.0. Here each need $n_i$ is one of the elements in the needs taxonomy described in the last section.

Since a choice is rarely labeled by a HNSI, this present teaching discloses how an HNSI may be generated by one or more methods. One of the simplest exemplary approaches is to let a person, such as a product designer or marketer, tag each choice in the form of a HNSI vector described above via one or more computer interfaces. However, this manual effort may not scale as the number of choices grows. Moreover, the original intended HNSI of the choice may change after people take the offer. For example, a rain coat originally intended for only protecting people from rain may be used by its users as a status symbol. In such a case, the HNSI should be updated to indicate new needs that it fulfills.

To create HNSIs for a large of number of choices and accommodate the dynamics in their HNSIs, an alternative exemplary approach is a crowd-sourcing approach, where the creation of each HNSI is solicited on a crowd-sourcing platform such as Amazon Mechanical Turk. Turkers are then asked to create a HNSI for each choice by the format indicated above. The collected HNSIs are then consolidated to produce an integrated HNSI for each choice. The consolidation process may be the following: for each rated need n, it first computes the inter-rater agreement—the level of rating agreement among the turkers using one of many methods such as Krippendorffs alpha. If the level of agreement has exceeded a certain threshold (e.g., 70%), it then computes the corresponding $s_i$—the choice's ability to satisfy need $n_i$ by taking the average score given by the Turkers on this particular need. The computed level of agreement may be considered the confidence factor $f$ for the rated need.

Although a crowd-sourcing approach is much more scalable than a manual tagging approach, it may not reflect the true HNSI of an offer, since it is difficult to verify that the participants (crowd) have actually experienced with the choice themselves (e.g., working in a job position or using a product). Thus, a more preferable exemplary embodiment is to automatically infer the HNSI of a choice by using various choice-related information.

Figure 6:
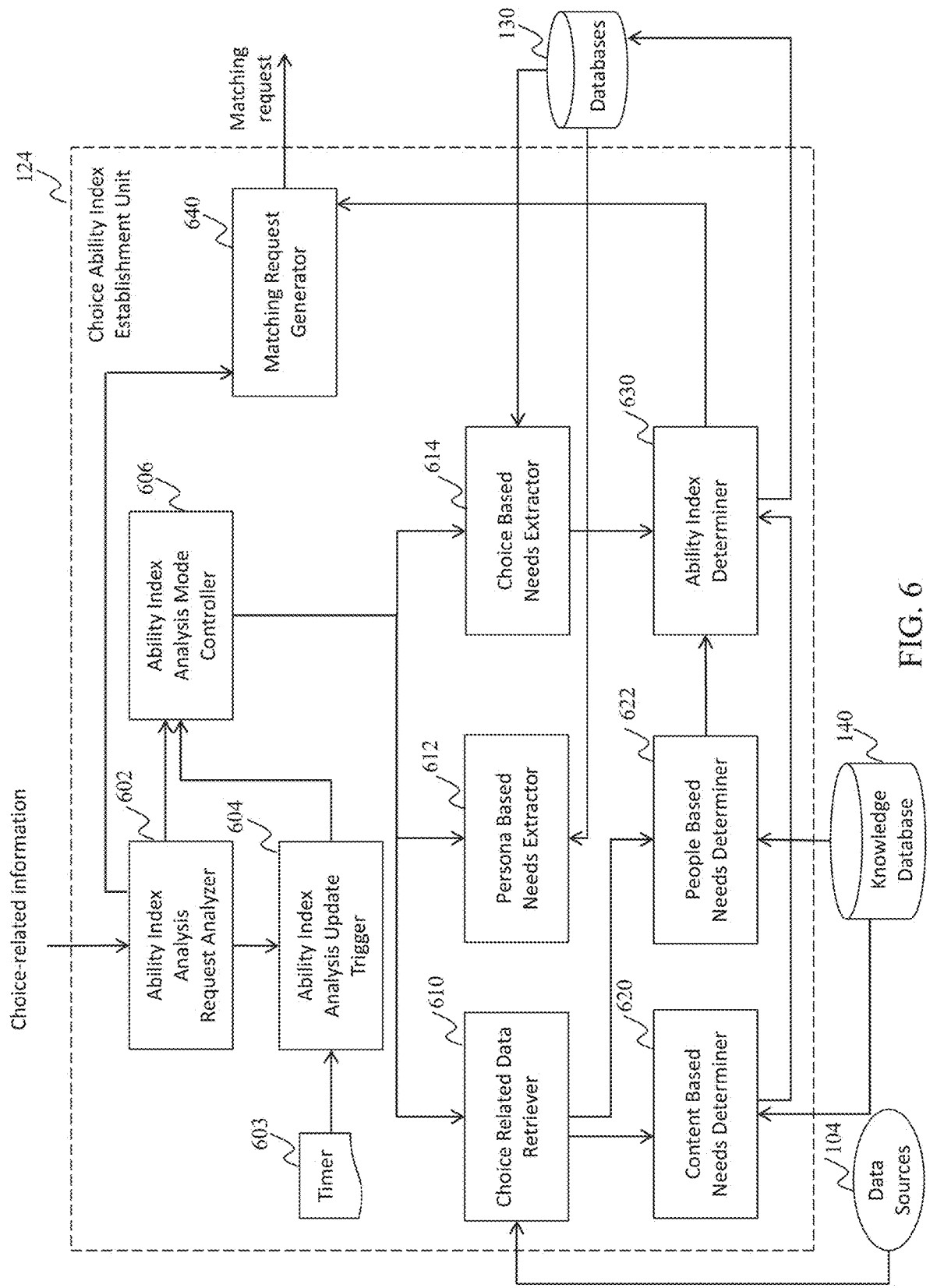
FIG. 6 illustrates an exemplary diagram of a choice ability index establishment unit, according to an embodiment of the present teaching.

FIG. 6 illustrates an exemplary diagram of a choice ability index establishment unit 124, according to an embodiment of the present teaching. FIG. 6 shows one of many exemplary embodiments for automatically creating the HNSI of a choice. In this structural diagram, the input is one or more pieces of choice-related information, such as the choice under concern and various external data sources (104) to be used to infer the HNSI. It may also indicate whether this is to create a new HNSI from scratch or update an existing one of a given choice. The input is first analyzed (602) to extract key information to formulate a task for further processing. At the top level, there are two types of tasks: (1) Create a new HNSI and (2) Update an existing HNSI. If the task is to update an existing HNSI, it is further distinguished by the type of update: one-time vs. periodical update. If it is a periodical update (604), it checks the attached timer (603) to see whether it is time to perform the update. If it is an one-time update or a periodical update with the right timing, the task is handed to the controller (606). If this is a task of creating a new HNSI, the task is also sent to the controller. Given a task, the controller (606) routes the task to different components mostly depending on the data sources to be used for inferring an HNSI.

If the task is to create a new HNSI and the data sources used to infer the HNSI is the description or comments of the choice (e.g., text description and/or images), the task is routed to module 610, which retrieves the relevant choice description. The retrieved data is then analyzed to determine the human needs that the choice may satisfy (622). If there is also sufficient information about the people (e.g., reviewers of a product) who give comments or descriptions about the choice, the information about the people is also retrieved and sent to module 622 to determine the potential needs that the choice may satisfy.

If the task is to create a new HNSI and the data sources used to infer the HNSI is the persona of the choice, module 612 uses the persona to infer the needs that the choice may satisfy.

If the task is to create a new HNSI and there is very limited information about the input choice itself, the task is routed to module 614 to extract the needs of similar choices in the databases. The needs of these choices may then be used to approximate the HNSI of the choice under examination.

All inferred needs information is sent to module 630 for consolidation to create the HNSI. The created HNSI is stored in the databases (130). The knowledge base (140) supplies one or more pieces of information for one or more components (e.g., 612, 620, 622) to make inferences.

If the task is to update an existing HNSI of a given choice, it is routed to corresponding components (610, 612, and 614) based on which source of information (e.g., choice description and/or personas) has been updated.

Figure 7:
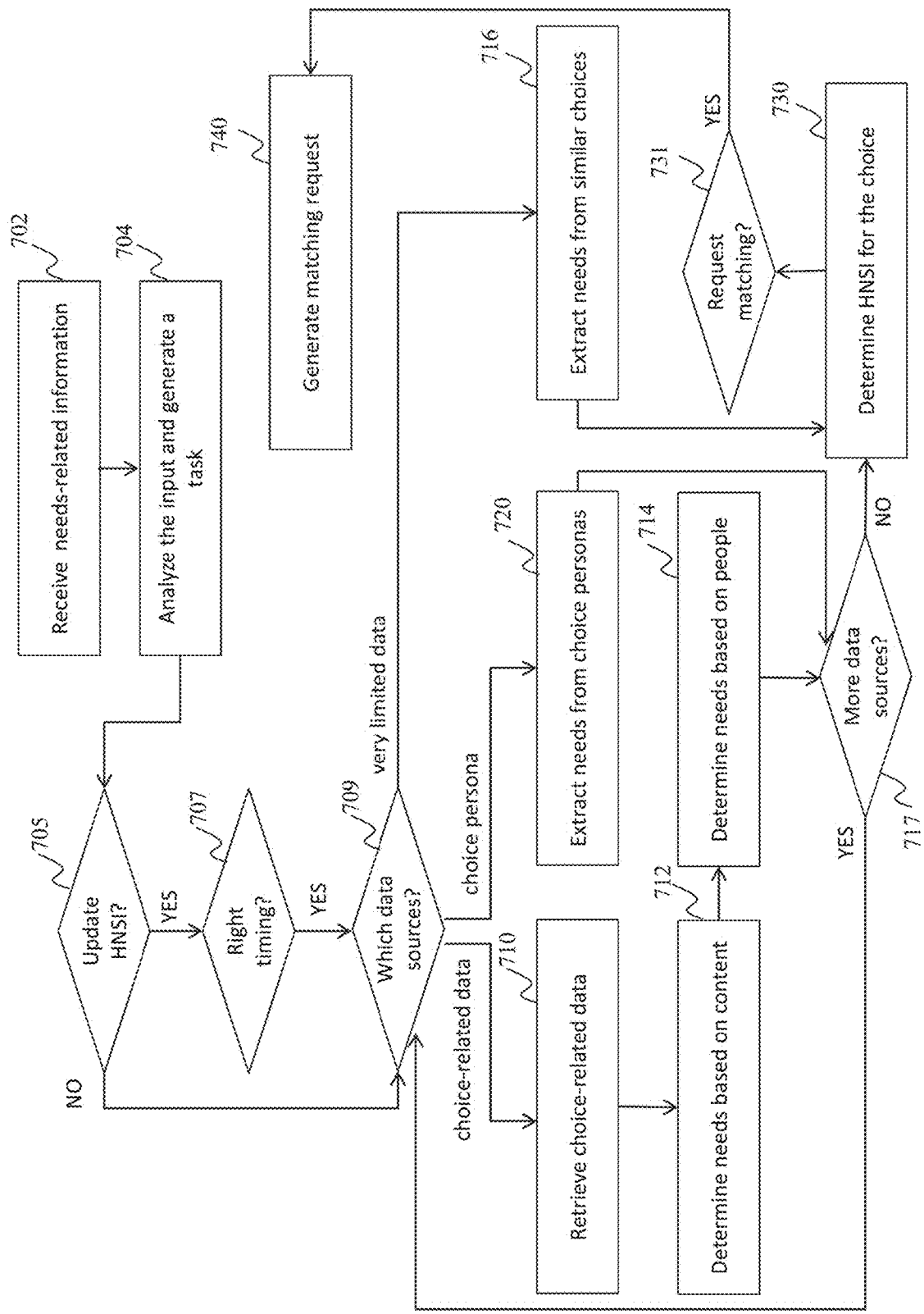
FIG. 7 is a flowchart of an exemplary process performed by a choice ability index establishment unit, according to an embodiment of the present teaching.

FIG. 7 is a flowchart of an exemplary process performed by a choice ability index establishment unit, according to an embodiment of the present teaching. As shown in FIG. 7, the process of determining the HNSI of a choice starts with receiving a set of choice-related information (702). The input is analyzed and a task is generated (704). It checks whether the task is to update an existing HNSI (705). If it is, it checks whether it is a periodical update and this is the right timing (707). If it is, it then checks which data sources to be used to perform such an update. Similarly, if the task is to create a new HNSI, the process moves forward to check which data sources to be used (707). If there is no data or very limited data about the choice (e.g., just a paragraph or an image), it calls module 716 that retrieves the similar choices and extracts their needs. The derived needs are then sent to module 730 to determine the HNSI. If the data is to use choice-related data, such as the choice reviews, it calls a retriever relevant information for analysis (710). The retrieved content, such as the actual reviews, is sent to 712 to analyze and extract the relevant needs from the content. The process continues and checks whether there is additional data to be used (717). In this case, there may be data about the relevant content producers (e.g., reviewers). Module 709 then directs the retriever to retrieve the data about the relevant people (710). The retrieved data is then used to determine the needs based on the retrieved people (714). It then checks again to see if any other additional data source is still available (717). If there is and the data source is the persona(s) of the choice itself (709), such information is then used to extract needs from the persona(s) (720). If all data sources are already consumed (717), module 730 is then called to synthesize the HNSI. It also checks whether there is a request to find matches for this choice (731). If there is, it generates a matching request (740). Next embodiments of the present teaching describe in detail of the following key components: 710, 712, 714, 716, 720, and 730.

At 710, the choice-related data is mostly user-generated content, often authored by receivers of the choice, e.g., users of a product or service or employees of a company. Since this type of data is generated by a group of people who care about the choice and their needs may be used to approximate the HNSI of the choice. However, there are two situations, not every user favors a particular choice. If such an affinity does not exist, it is certainly difficult to estimate how such a choice may satisfy a person's needs. For this reason, the retriever filters out user-generated content that does not show an affinity to the choice. The simplest way to do so is to retain only the content with a positive tone, as the positivity may signal the affinity between the choice and the author. Although accurately identifying fine-grained positive features in opinions or reviews may not be easy, just identifying an overall positive review is very much doable. Embodiments of the present teaching may use the appearance frequency of positive words in a review as cues to determine whether a review is positive. The positive words may be identified from one or more sentiment analysis dictionaries. As a result, it retrieves all choice specifications as well as the user-generated content with a positive tone.

At 712, since each choice specification or review, such as a product description or review (also known as an evaluation), often implies the types of the human needs that the choice fulfills. For example, a review of a dress such those on Amazon may praise the dress "makes me look unique and cool", which precisely satisfies the human need of Self expression according to our needs taxonomy described before. Similarly, a job review (such those on glassdoor.com) may describe a particular position in a company as "fun and surrounded with friendly people", which satisfies the human need of Belonging. Even the marketing material of a chocie, such as the blogs written by a marketer, may imply which human needs the choice may satisfy. To capture these implied satisfied needs, a need-descriptor dictionary (330) is constructed. Each entry of the dictionary includes the following information:

N: $d_1, \ldots, d_K$, where N is a need in the need taxonomy, $d_i$ is a descriptor, such as a word or an image, that describes the need. Here is an example entry describing the style need Dramatic in a set of words:

Dramatic: "bold", "latest", "show stopper", "attention grabbing" Using this dictionary, an algorithm may infer the score S( ) of a particular need ($n_i$) as follows:

$$S(n_i) = \sum_{j=1}^{K} f(n_i, d_j)$$

Here descriptor $d_j$ is one of the descriptors related to need $n_i$ in the dictionary, function $f( )$ computes the normalized frequency of descriptor d, appearing in all the descriptions about the choice. A reliability metric may also be computed by running the same algorithm on various samples of the input content (e.g., choosing many random samples of half of the descriptions) and then computing similarities of all the results. The higher the similarity is, the more stable/reliable the analysis is. The calculated reliability may then be used as the confidence factor for each of the needs score.

At 714, in some cases, additional information may be available with the content on the choice. For example, the authors of the content may already be in the databases (130). In this case, the needs of the authors may be directly retrieved and used to estimate the types of needs that the choice may satisfy. Even if the authors are not yet in the databases, other data generated by them may be retrieved. For example, a review about a dress is published on Twitter and the reviewer's all tweets are public. In such a case, the other information produced by this reviewer is also valuable and may be used to estimate the types of human needs that a choice may fulfill.

Let's consider several exemplary situations associated with this step 714.

One exemplary situation is where the people are already in the databases and their needs are then directly retrieved.

Another exemplary situation is where the people are not in the databases yet but additional data produced by them (e.g., their writeups on something else) is available. In this case, such data is retrieved for each person. The method described in 122 may be used to derive the needs of these people. Note that the dictionary-based approach described above in 712 may not work for directly inferring a person's needs from his/her own behavioral data. The reason is similar to those stated in module 550, since one's behavioral data is often diverse (on a wide variety of things) and sparse (very little one topic, e.g., fashion), it is difficult to use such data to infer specific needs (e.g., fashion needs). In contrast, in 712, all the content used to infer the needs is about one topic: the choice.

Now given a set of people related to the choice and their inferred needs, there are multiple ways to estimate the types of human needs that the choice may satisfy. One method is to choose the people who have demonstrated affinity with the choice, e.g., giving a rave review about the choice, since it might be difficult to estimate which needs that the choice has actually satisfied if the affinity does not exist. To do so, the method first selects reviews/opinions with a positive tone. Although sentiment analysis in general is non-trivial, identifying whether a review with a positive tone is relatively simple since one may count the number of words that express positive emotions based on one or more sentiment dictionaries. Assume that now the reviews/opinions with a positive tone are selected. The method then conslidates the inferred needs of people who are the authors of these positive reviews/opinions. The consolidation process may be done in one or more ways. One way is to compute the level of agreement, for every need associated with this group of people. In case a need score appears in one person's needs, but not in another person's needs, the same need with a score 0.0 is then added to represent the absence. If the level of agreement for a need is greater than a threshold (e.g., 75%), this need with its mean score is then kept as one of the entries in the HNSI. Instead of choosing the entry with the mean value, an alternative method is to choose the need and its score with the highest confidence factor, as this entry is the most reliable one.

Instead of choosing people who have shown affinity with the choice, an alternative implementation may be to use a supervised learning to learn the correlations between one or more human needs and the positive or negative opinions of a choice. This model implies that a combination of certain human needs are highly correlated with getting the positive opinions of the choice, which in turn signals the choice's ability to satisfy such needs. To do so, embodiments of the present teaching first construct a training data set. Embodiments of the present teaching use the same sentiment analysis to find both positive and negative examples. In particular, a person who authors a positive review or utters a positive opinion about the choice is considered a positive example, otherwise, it is a negative example. In each example, a person's inferred needs are used as features, so as the positive or negative label. Based on these examples, a statistical model may then be trained to learn the correlations between one or more human needs and the positive opinions of the choice. The result of this method is one or more human needs with their respective weights that may be used to predict the positive opinions of the choice. One may use N-fold (e.g., N=10) cross validation to compute a F-measure using the training data set. The F-measure may then be used as the confidence factor for the inferred needs and their scores (weights).

At 716, in certain situations, there is simply little data available about a choice, especially when a choice is new. In such a case, this step is to choose choices that are similar to the given choice, and then use their HNSIs to estimate the HNSI of the given choice.

The similarity of between any given two choices may be computed by comparing one or more features, including the chocie description (e.g., a short product description), the images associated, etc. Based on the computed similarities, one or more choices are retrieved from the databases (130). The retrieved choices may be ranked based on their similarity to the given choice. One method is to use the top-ranked HNSI to approximate the HNSI of the choice. Another approaches is to choose the top-N as long as they are still within the certain range of similarity (e.g., by a particular threshold), it then uses the similar consolidation method described in 714 to merge the HNSIs of the top-N choices and use the merged result to further approximate the HNSI of the given choice.

At 720, certain choices may be quite complex and abstract, e.g., a product line, a big company, or a brand itself. In such a case, specific information on such a choice may not be available. However, such a choice may often be associated with one or more distinct brand persona(s). Moreover, each brand person often directly associates with the types of human needs that it tries to satisfy. For example, a Hero brand persona aims at satisfying humand needs of needing safety and security, while a Caregiver brand person is intended to fulfilling human needs to be taken care of. Thus, a rule-based approach may be used to indicate the types of human needs satisfied by each brand persona. Here is an example:

IF Persona="Hero" THEN Human-Needs=("Safety & Security", 1.0)

Using such a rule, given a choice and one or more of its personas, a set of human needs that it may satisfy is then derived.

At 730, as described above, one or more data sources and one or more methods may be used to estimate one or more needs entries in the HNSI of a given choice. By the type of data used, one or more needs entries are derived from the following data sources: From the descriptions of the choice, including marketing material and third-party descriptions and/or evaluations; From the people related to the choice; From similar choices; From one or more brand personas of the choice.

This step 730 is to consolidate needs entries derived from all these sources to create a single HNSI. One or more methods may be used to merge these entries. One method is to assign a rank to each source depending on its quality. For example, one may consider the needs derived from the description of the choice (a) be more reliable than any other sources (b-d). Thus, it may choose to use the needs entries derived from this source as its HNSI. An alternative approach may be to use the rank to merge two needs entries derived from different sources, the one with a higher rank is then kept. An alternative method is similar to the one described in module 714 by computing the level of agreement among the entries with the same need but different scores and different confidence factors to decide the merge.

Figure 8:
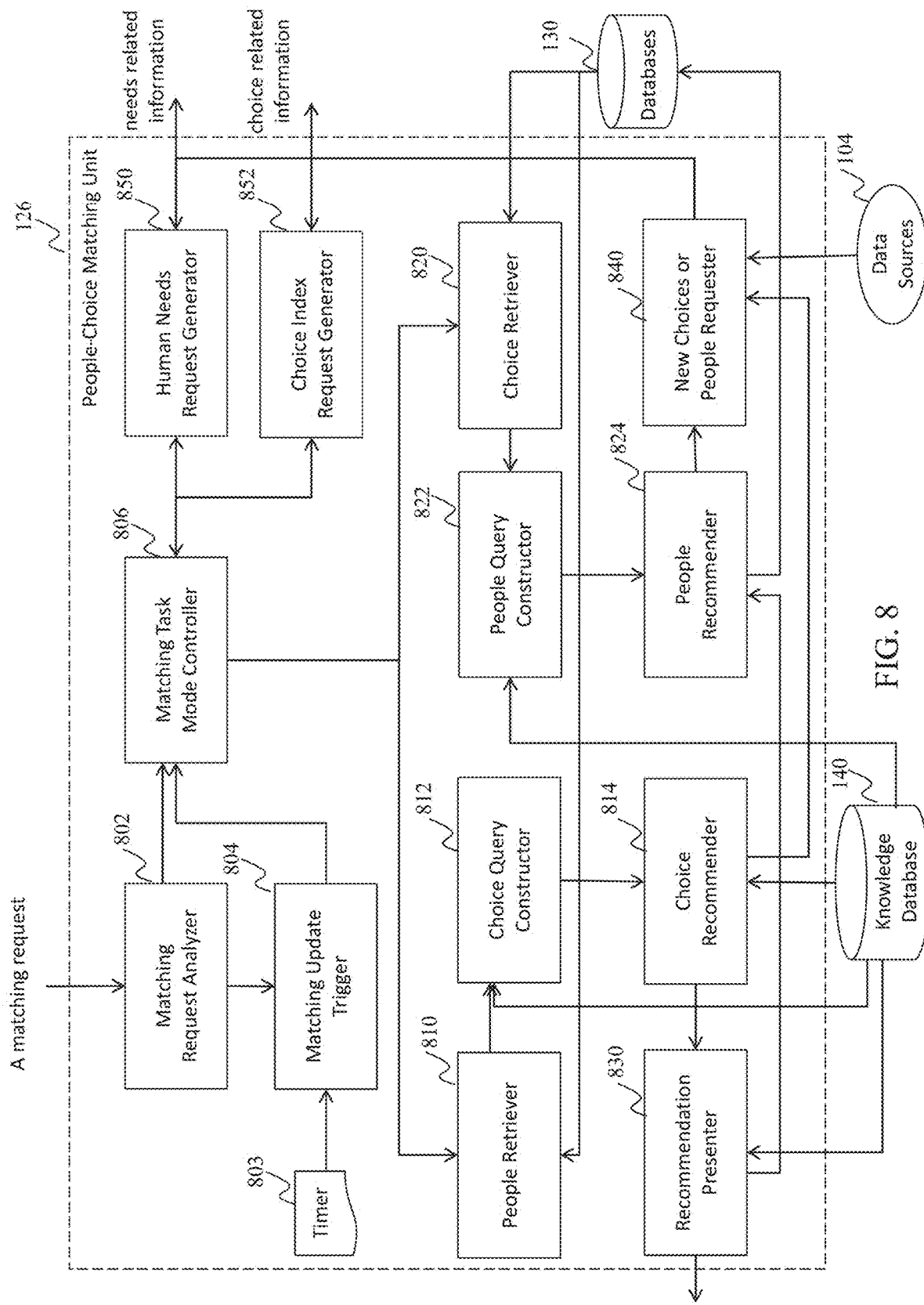
FIG. 8 illustrates an exemplary diagram of a people-choice matching unit, according to an embodiment of the present teaching.

FIG. 8 illustrates an exemplary diagram of a people-choice matching unit, according to an embodiment of the present teaching. Given a matching request, the matching unit (126) is recommend one or more choices to one or more people, or vice versa. Depending on the matching request, the recommendations are made for different situations. FIG. 8 captures an exemplary embodiment of a matching unit that supports various people-choices matching, while FIG. 9 captures the process flow. The detailed embodiments of all core components are also described in the process flow section.

As shown in FIG. 8, the input to the matching unit is a matching request. The request is first processed by the request analyzer (802), where a matching task is also created using the information specified in the request.

If the matching task is to update one or more existing matches, it first checks whether this is an one-time or periodic task. If it is a periodic task, it checks with the update trigger (804), which has a timer attached to (803). If the timing is right, the update task is then activated and sent to the task controller (806). If the task is to seek new matchings, the task is also routed to the controller (806).

No matter if the matching task is to recommend choices to target people or vice versa, the controller checks whether the needs information for the target people or the HNSIs for the target choices is available. If it is not, it generates a request (850) to the needs establishment unit (122) to infer the needs of the target people or generates a request (852) to the choice HNSI establishment unit (124) to establish the HNSIs for the target choices.

If the matching task is to recommend choices to people, the task is routed to module 810, which retrieves the target people and their information from the databases (130). The retrieved information is forwarded to module 812 to construct one or more queries to search for matching choices. The formulated queries are then sent to module 814 to recommend matching choices to the target people. Depending on the type of target people and choices to be recommended, the query constructor (812), and the choice recommended (814) may function differently to support the specific utility of the matching engine (126).

Figure 10A:
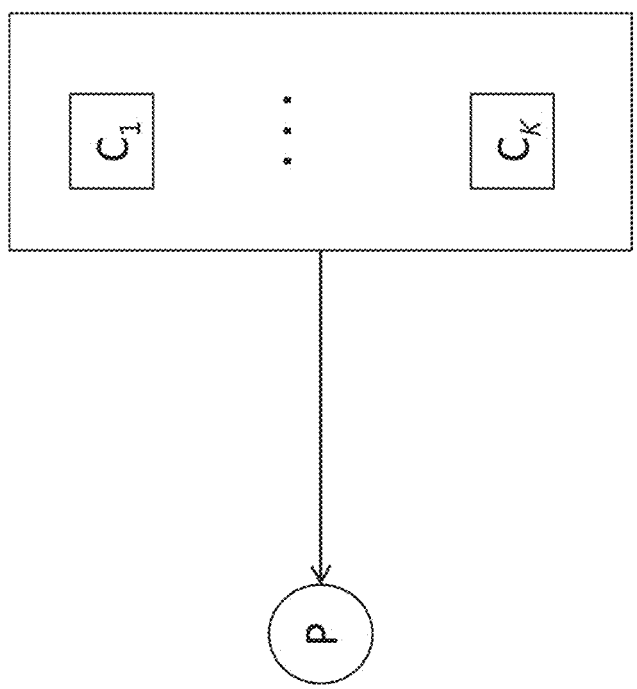
FIG. 10A illustrates an exemplary function of a people-choice matching unit to make individual choice recommendations to individuals, according to an embodiment of the present teaching.

One exemplary utility is to make individual choice recommendations to individuals (FIG. 10A). This perhaps the most common utility of the matching engine, such as a user requests suitable choices for oneself. In this case, the matching is done between each individual's information including his/her needs with each choice's HNSI.

Figure 10B:
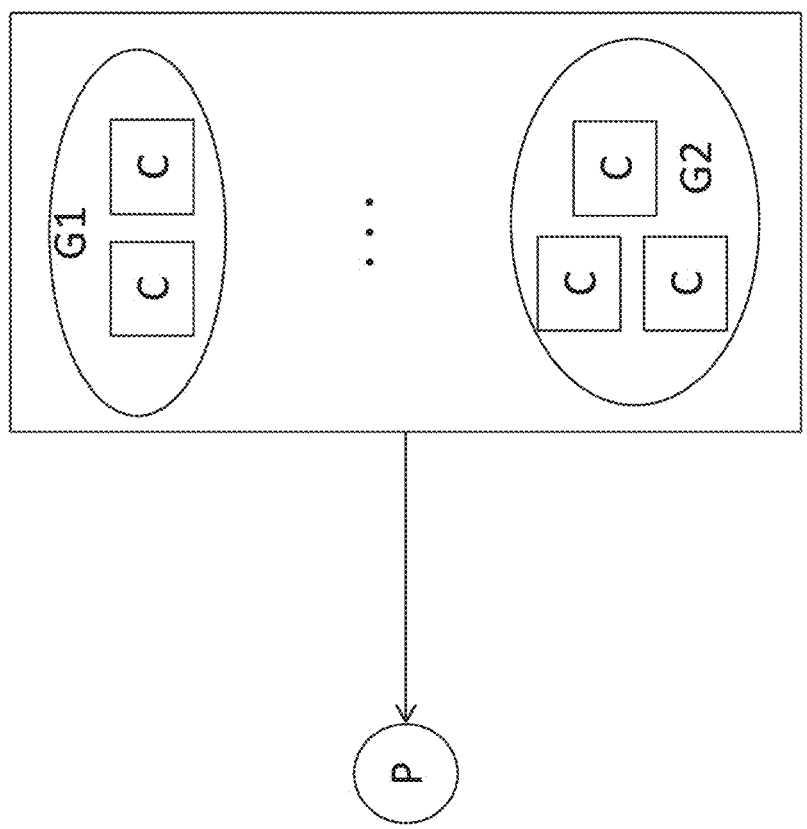
FIG. 10B illustrates an exemplary function of a people-choice matching unit to make choice bundle recommendations to individuals, according to an embodiment of the present teaching.

A variant of the above exemplary utility is to make choice bundle recommendations to individuals (FIG. 10B). Instead of recommending a set of independent choices to an individual, this case is to recommend a choice burdle—one or more related choices to an individual. For example, in a travel domain, instead of recommending just hotel choices, a user may request to recommend groups of choices—choice bundles, where each group includes a hotel choice, a car rental choice, and a flight choice. In this case, the engine 120 considers what a choice bundle may offer and match the integrated HNSI of the bundle with the needs of individuals.

Figure 10C:
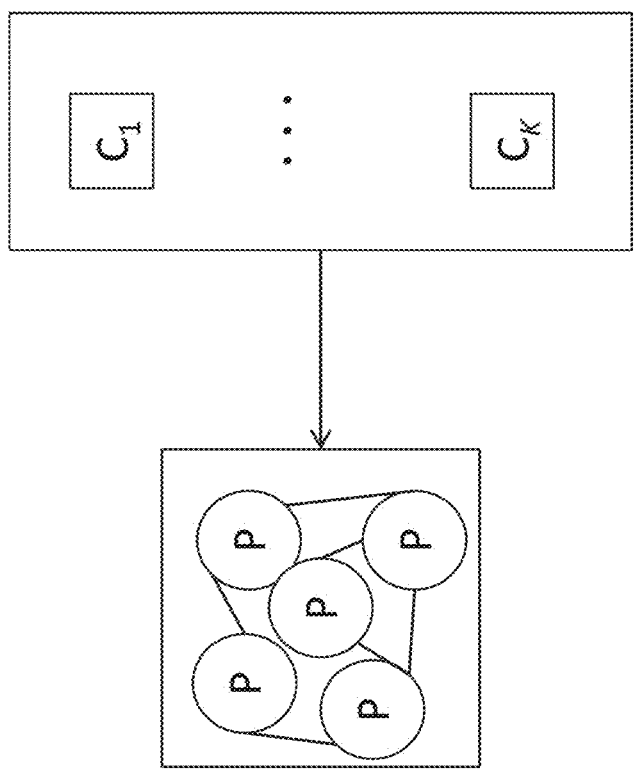
FIG. 10C illustrates an exemplary function of a people-choice matching unit to recommend individual choices to one or more groups of individuals, according to an embodiment of the present teaching.

Another exemplary utility is to recommend individual choices to one or more groups of individuals (FIG. 10C). This is also a very common utility of the matching engine. For example, a group of family members or a group of friends may request suitable choices that satisfy the needs and wants of the entire group. In this case, the matching engine considers the integrated needs of a group and uses such needs to find matched choices.

Figure 10D:
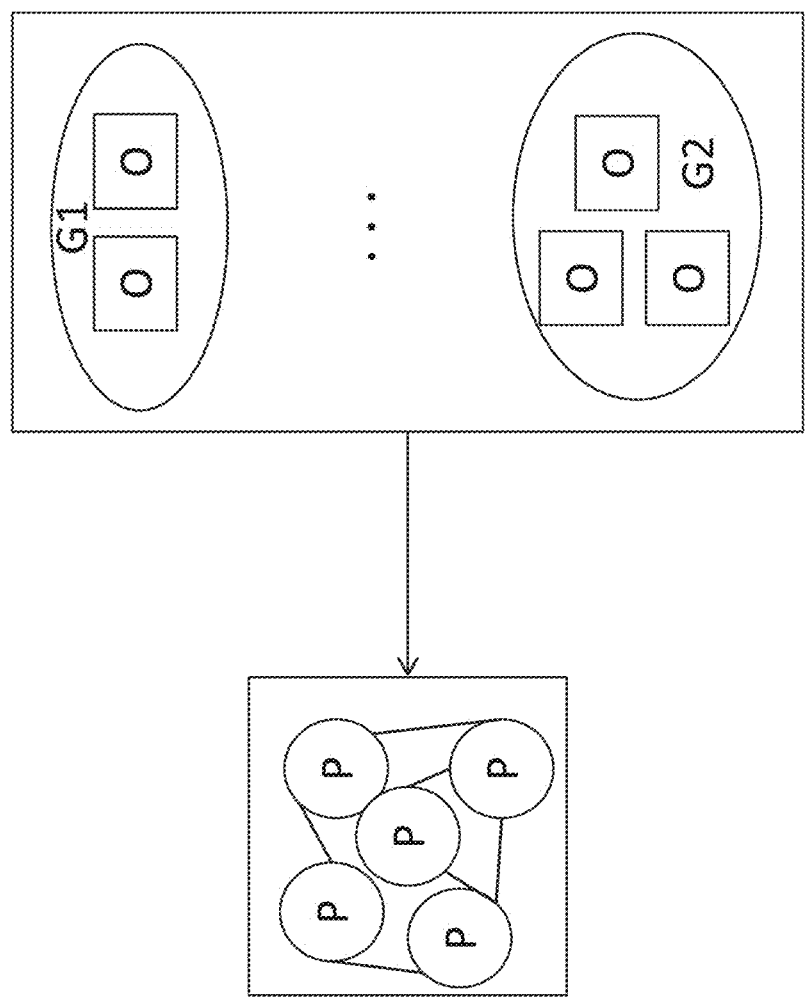
FIG. 10D illustrates an exemplary function of a people-choice matching unit to recommends choice bundles to one or more groups of individuals, according to an embodiment of the present teaching.

Similar to above, a variant of the above exemplary utility is to recommends choice bundles to one or more groups of individuals (FIG. 10D). In this case, the matching engine considers the integrated needs of a group as well as the integrated HNSI of a choice bundle (e.g., travel bundles to a family).

The essence of marketing is trying to find the right people (audience) for one or more choices (e.g., products, services, and brands). From the choice suppliers' point of view, perhaps the most valuable utility of the matching engine is to find the right audience (people) for a given choice. This is even more valuable for suppliers to find the right audience for their new products/services/brands, since it is very difficult to find suitable people by their previous behavior (e.g., Amazon) with these products since none exists yet. However, it may be known what types of human needs that these new offers (choices) aim at satisfying, our matching engine uses such information to find people who have such needs. In this case, the task is first routed to module 820, which retrieves the information about target choices from the databases (130). Module 822 constructs one or more queries for finding the suitable people for the target choice(s). Given the target choices and people queries, module 824 recommends the matched people. Depending on the type of target choices, there are at least two exemplary utilities of the matching engine in this case.

Figure 10E:
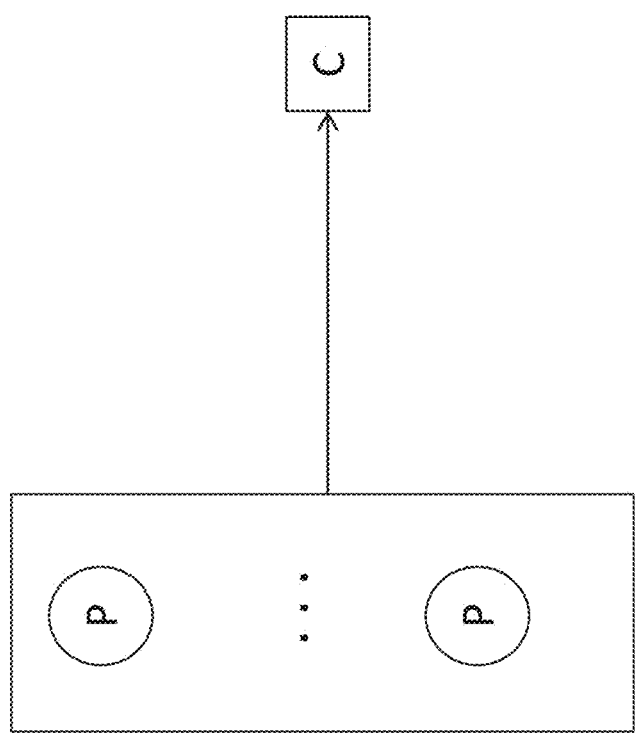
FIG. 10E illustrates an exemplary function of a people-choice matching unit to find suitable people for individual choices, according to an embodiment of the present teaching.
Figure 10F:
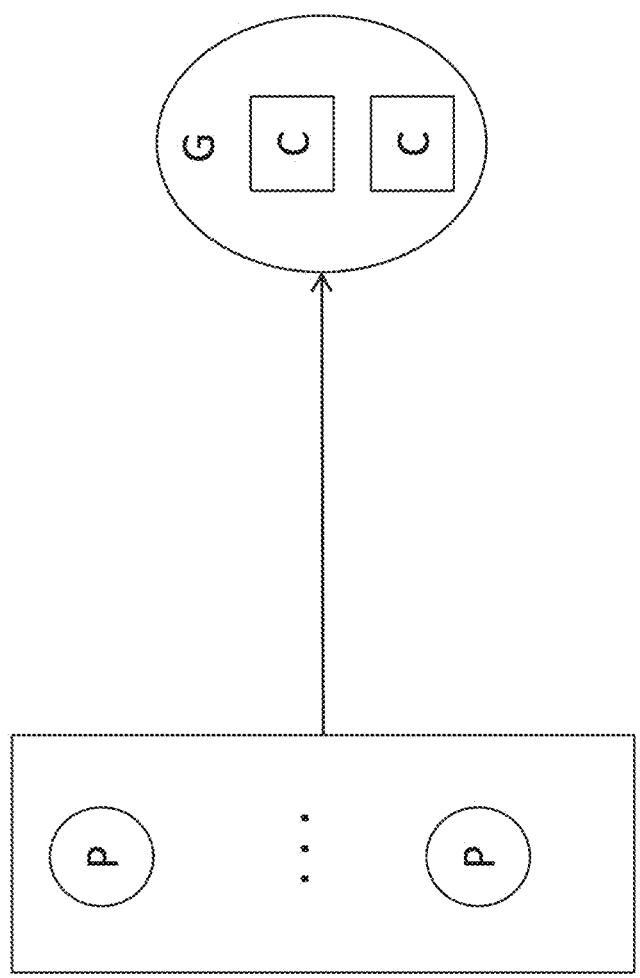
FIG. 10F illustrates an exemplary function of a people-choice matching unit to recommend people suitable for a choice bundle, according to an embodiment of the present teaching.

One exemplary case is to find suitable people for individual choices (FIG. 10E). In this case, the matching engine is to match the HNSI of each chocie with the needs of individual people. A variant of the above exemplary utility is to recommend people suitable for a choice bundle (FIG. 10F). In this case, the matching engine is to match the integrated HNSI of each choice with the needs of individual people.

Figure 10G:
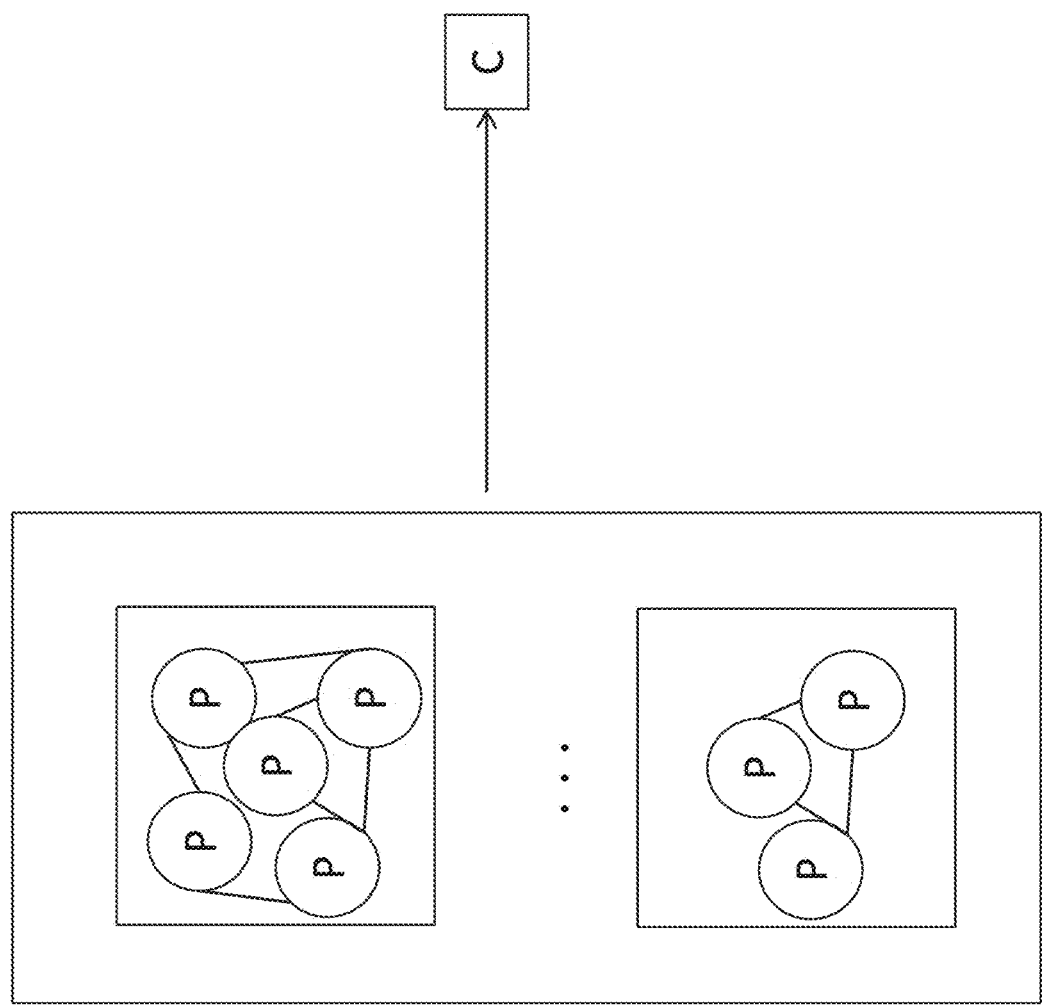
FIG. 10G illustrates an exemplary function of a people-choice matching unit to find suitable groups of people for individual choices, according to an embodiment of the present teaching.
Figure 10H:
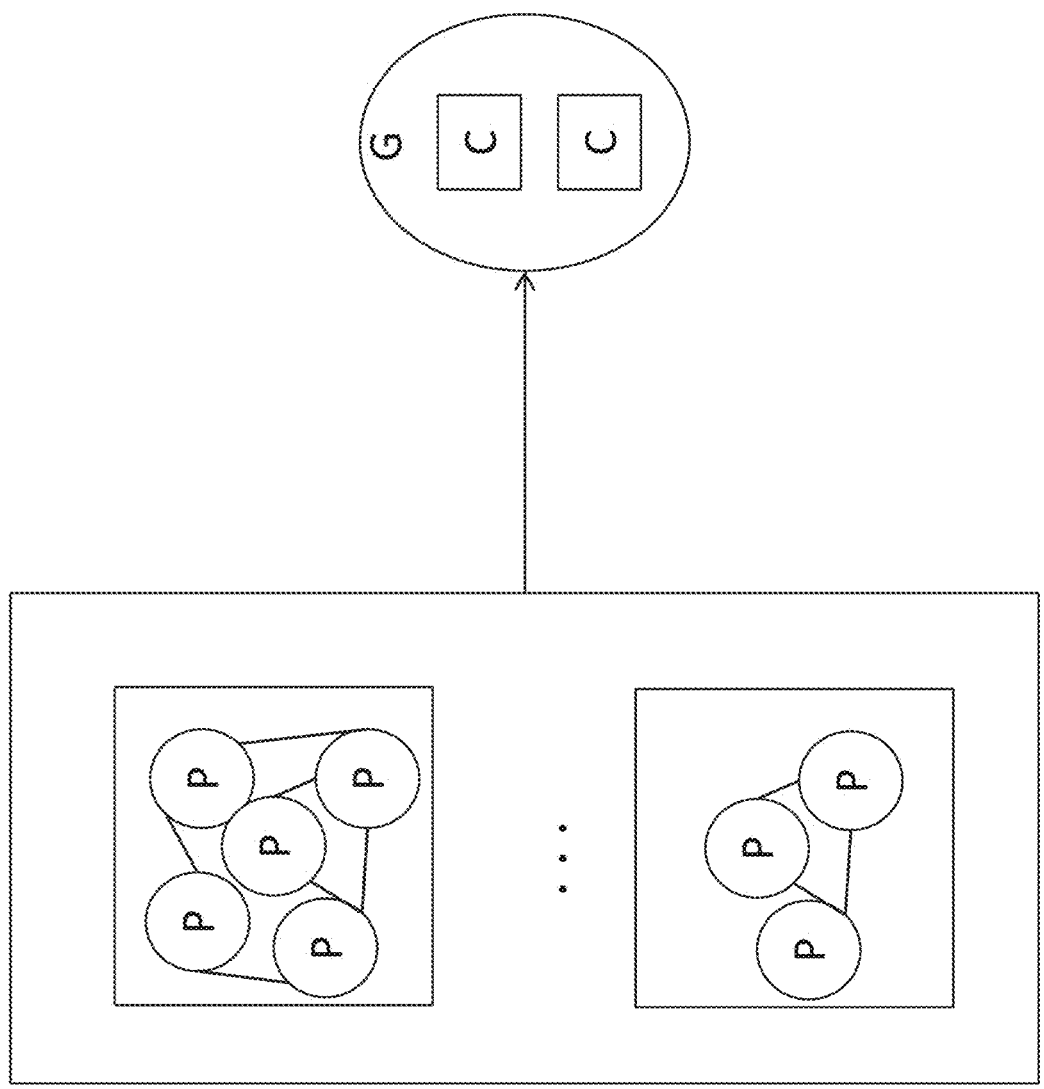
FIG. 10H illustrates an exemplary function of a people-choice matching unit to find suitable groups of people for choice bundles, according to an embodiment of the present teaching.

Another exemplary case is to find suitable communities (groups of people) for individual choices (FIG. 10G). In this case, the matching engine is to match the HNSI of each choice with the needs of communities. This utility may be quite useful for products/services targeting communities, such as a collaboration tool for a company or organization. A variant of this exemplary utility is to find suitable communities for choice bundles (FIG. 10H). For example, recommending a bundle of workplace communication and collaboration tools to a company or organization. In this case, the matching engine is to match the integrated HNSI of a choice bundle with the needs of communities.

Depending on the quality of the recommendation results, the recommenders (814 and 824) may decide to request additional recommendation items (840) or send the results to be presented (830). Module 840 connects to external data sources (104), such as Twitter and Facebook, and crawls more information (e.g., people or choices), and requests the establishment of the needs of crawled new people (850) or choices (852), which may be used for making more recommendations.

In the cases of updating existing matchings, the task is processed in the similar way by using the updated information for the people and/or the choices. Note that the support of periodic updating is a very powerful function, since people may discover new choices that match their true needs periodically even if their needs have changed. Similarly, owners or sellers of choices (products/services) may also receive periodical updates of new people who may be suitable for the choices that they offer.

All recommendation results are stored in the databases (130). The knowledge base (140) may be used by the recommenders to make recommendations.

Figure 9:
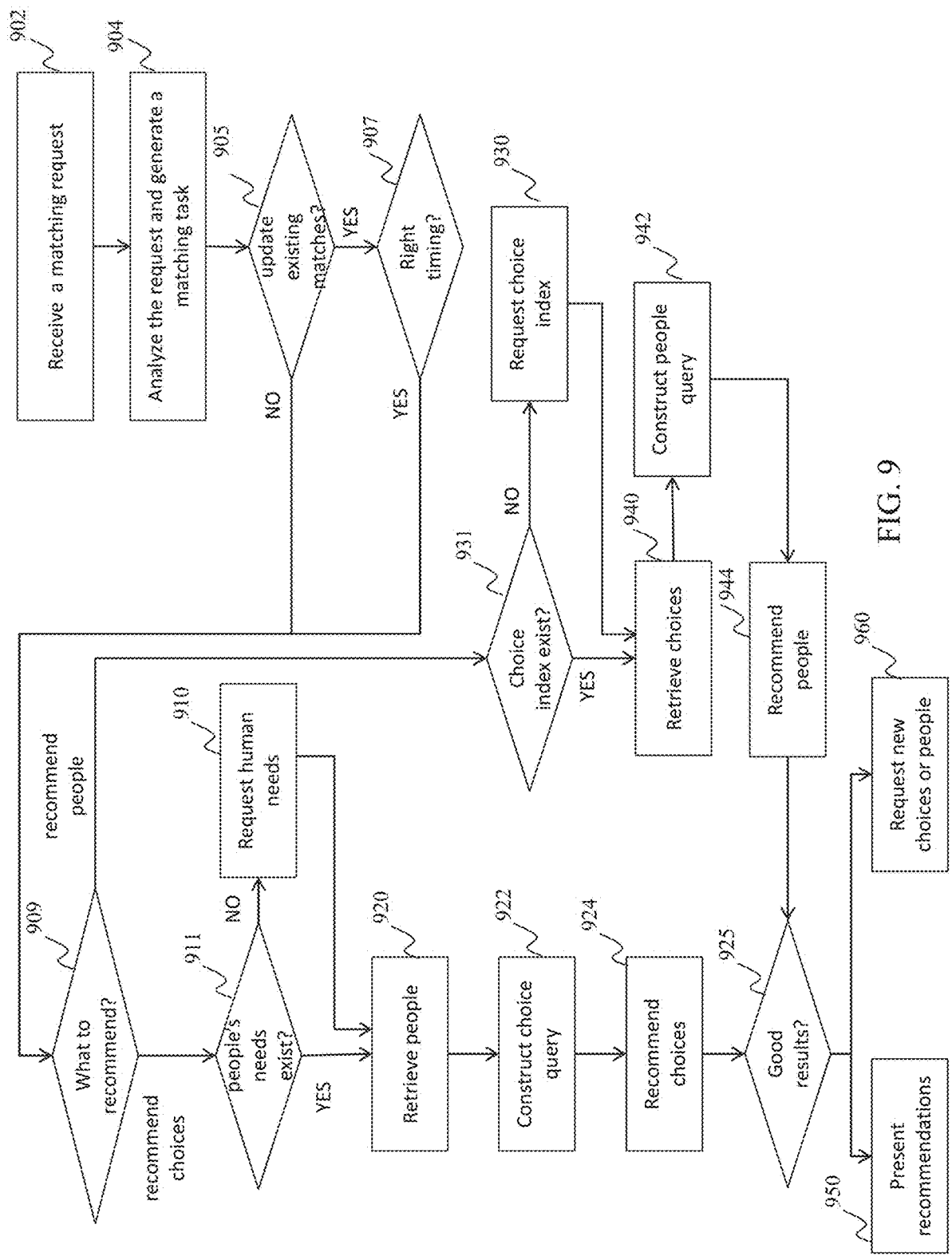
FIG. 9 is a flowchart of an exemplary process performed by a people-choice matching unit, according to an embodiment of the present teaching.

FIG. 9 is a flowchart of an exemplary process performed by a people-choice matching unit, according to an embodiment of the present teaching. As shown in FIG. 9, a matching process starts with receiving a matching request (902). Such a request is analyzed and a corresponding matching task is created (904). Next it checks whether this is to update existing matches (905). If it is, it checks whether this is the right timing (907). If it is not an update or it is the right timing, it then checks the targets to recommend (909). If this is to recommend choices to people, it checks whether it knows the needs of these people (911). If it is not, it requests to compute the needs and traits of these people (910). Otherwise, it retrieves the information about the target people (920). Based on the retrieved people, one or more choice queries are formulated (922). The choice queries and the people information are then used to recommend the right choices to the target audience (people) (924).

If the task is to recommend people to one of more choices (909), it checks whether the HNSI exists for each chocie involved (931). If the information does not exist, it requests to compute such information (930). Otherwise, it retrieves the HNSIs of the target choices (940). Using the retrieved choice information, people search queries are constructed (942), and then suitable people are recommended for the target choices (944).

Depending on the quality of the recommendations (925), the results may be presented (950) or new items are requested (960).

Next embodiments of the present teaching describe more details of the following components, since they are the innovative and unique pieces of this human-needs-based matching unit.

To find suitable choices that may satisfy one or more needs of a person, this step 920 is to construct one or more choice queries to look for the desired choices. Through an example below, embodiments of the present teaching show what is included in such a choice query:

CQuery={<"query terms". "summer dresses"><"result type": "individual choices"><"target": "jsmith"><quantity "100"><"qthreshold": "0.6">}

Here a choice query may include one or more query terms, which are the search terms indicating the types of choices. Note that some times the query terms may be missing. For example, a user may just want to find something that may be suitable for him/her without specifying the "type" of things. This is useful since the user may discover new things that satisfy his/her needs but s/he is completely unaware before let alone requesting it explicitly.

Besides query terms, a choice query may also specify the type of results (result type) expected. In the above example, it expects individual choices to be recommended. Instead of requesting individual choices, one may request "choice bundles" that groups one or more choices together as described earlier. The field target specifies the target audience, the people to whom the choice recommendations to be made. It contains the information to access an individual or a particular group of people. In the above example, the target is an individual with an id "jsmith". The field quantity indicates how many choices are desired (e.g., 100 in the above example). The field qthreshold specifies the qualify threshold for acceptable recommendations. In the above example, it states that the matching between the recommended choices and the given people must be at or greater than 60%. Additional fields, such as time constraint that indicates when the recommendations are needed or bid that indicates how much the target people may be willing to pay for the search or purchasing the choices may also be included. Any other fields that are often used by existing recommendation systems, such as vendor, shipper, or payment preferences may also be included.

Choice queries as shown above are formulated by taking information from different places. One source of information is the input matching request. For example, the query terms, result type, and target are often specified in the matching request. Other detailed fields may be set by default (e.g., qthreshold) or inherited from previous interactions. For example, a user may have interacted with the system before, and her payment preference has already been captured and stored in the databases.

In many cases, people may look for things that are not well defined. This query constructor may then generate one or more queries to refine the original request. Assume that the person is looking for Christmas gifts, the query constructor may generate multiple queries, each looking for different types of things, such as books, toys, apparel. Furthermore, people may look for multiple types of things. In this case, the query constructor may also split the original request into multiple disjoint queries. For example, if one evaluates whether he should purchase a car vs. a motorcycle. He wants to find both cars and motorcycles that satisfy his needs before making a decision. In this case, the query constructor generates two querys, one looking for cars while the other looking for motorcycles.

To handle above cases, the choice query constructor relies on the choice taxonomy (360) defined in the knowledge base (140) to generate multiple queries. Such a taxonomy defines the relationship among different choices. Using the above examples, Christmas gifts comprise multiple types of choices, such as books, toys, and apparel, while cars and motorcycles are peers under the Automotive category. Note that it is not always the case multiple choice queries are generated if people look for multiple related choices at the same time. For example, a person may look for hotels and flights at the same time. In such cases, there is still one choice query but the result type is "choice bundles" vs. "individual choices".

Given a target audience and one or more choice queries, this step 924 is to recommend suitable choices that match the needs of the target audience. Based on the type of target audience and the type of recommendations, there am four recommendation situations.

The first situation is to recommend Individual choices to individual people. In this case, the recommendation algorithm first retrieves one or more choices that match the choice query by one or more criteria. To do so, it computes an overall matching score between a chocie and the target individual by one or more matching criteria. While one or more methods may be used to compute such a matching score, the following is one of the exemplary implementations:

$$\text{Matching}(p, c) = \sum_{i=1}^{N} g_i(p, c) \times w_i$$

In this implementation, the function Matching( ) returns a score that indicates how well a choice c matches with a target individual p. Function $g_i($ ) computes the match between p and c by the th matching criterion, while weight $w_i$ indicates how important the criterion is in obtaining the overall matching. One exemplary criterion is to match the description of the found choices with the entire or part of the query terms. This is similar to any information retrieval tasks using keyword-based matches.

Another exemplary criterion is to match the HNSI of a choice with the needs of the target individual. Specifically, it computes the similarity of the inferred needs of the target individual and the human needs captured in the HNSL Here each implicit need associated with a person is a vector that encodes the type of the need (t), the need score (s), and the associated confidence factor. Using Example C mentioned earlier, one implicit need specified is ("Attention", 0.8, 0.75). On the other hand, inside a HNSI, each need vector also has the three types of information, the need type, the need score, and the associated confidence factor. While there are many approaches to measuring the similarity between two vectors, one exemplary method of measuring the similarity of two needs vectors is as follows:

$$Sim(p, c) = 1 - \sum_{i=1}^{K} \sum_{j=1}^{N} dist(v_i^p, v_j^c)$$

Here K is the total number of needs specified in the human demand for person p, and N is the total number of needs vectors specified in the HNSI of choice c. The vectors $v_i^p$ and $v_j^c$ are the needs vectors in the human demand and the HNSI, respectively. The distance between any two needs vectors may be further computed as the combined distances between the need types ($t_1$ and $t_2$) and their corresponding scores ($s_1$ and $s_2$):

$$\text{dist}(v_1, v_2) = \text{dist}(t_1, t_2) \times w_1 + \text{dist}(s_1 \times f_1, s_2 \times f_2) \times w_2$$

Note that the needs scores are normalized by their corresponding confidence factors ($s_1$ and $s_2$), and $w_1$ and $w_2$ are weights for each distance measure. The distance between two needs type may be pre-defined in the needs taxonomy (360). For example, the distance between two needs, Attention and Acceptance is smaller than that between Attention and Affiliation based on the needs taxonomy. This is because the first two are in the same needs sub-category (Respect from others), while the later two belong to two different needs categories.

Based on the matching criteria mentioned above, the recommender may find one or more matched choices from the databases (130). Depending on other information in the matching request, such as the specified quantity and quality criteria described above, it may further filter out unqualified choices. Here the matching score Matching( ) computed above is used to check whether the quality criterion is satisfied.

In the cases when there are multiple choices produce very similar matching scores, the recommendation engine may use other means to further differentiate the choices especially from the perspective of the target individual. One exemplary method may be the use of collaborative filtering by checking the people associated with the recommended choices. For example, there may be people to whom the same choices have been recommended and like the choices. Thus the choices are then ranked higher, if the target individual is more similar to the people who like these choices. The similarity between two people may be computed based on the similarity between their basic traits and needs. In other words, these choices satisfy the people who share the similar needs and traits even though their behavior has never overlapped (e.g., one has bought something from a site but another has never bought anything yet). This is very different from existing approaches, such as the Amazon.com and Netflix recommendations, where users must have overlapping behavoir (e.g., rating the same movie or buying the same book). Another exemplary method for finer-grained choice differentiation is to compute the similarity of the target individual's traits with the human traits of the choice. As mentioned earlier, a choice may be associated with a persona, who is associated with a set of human-like traits. The hypothesis is that "like attracts like". Although it may not always be true, using it as additional differentiation criterion may not hurt either especially the choices are retrieved mostly based on the needs match as described above.

If none of retrieved choices from the databases (130) has produced the required matching score by the specified quality criterion, the recommender then requests to find more choices from external data sources (e.g., via Google search by query terms) and then index these new choices by calling module 124. Otherwise, it sends the recommendation results for presentation.

The second situation is to recommend choice bundles to Individual people. In this case, the recommender finds one or more suitable choice bundles and recommends them to the target individual. This process is quite similar to the above except that it considers that the needs and wants of the target person be satisfied by a choice bundle instead of by one choice. To find the matched choice bundles, the recommender calculates an integrated HNSI of a choice bundle. Here embodiments of the present teaching assume choice bundles already exist in the databases. Even if they do not exist, an easy way to construct a bundle is to put two or more related choices together as a bundle. For example, in a travel domain, a hotel choice may be paired with a flight choice by their availability and destination criteria to create a travel choice bundle. There are many methods of calculating an integrated HNSI from one or more choices. One exemplary method may be to take a union of needs vectors in all HNSIs and consolidate the vectors with the same type by taking their average score. Another exemplary method may be to take a union of needs vectors but consolidate the vectors with the same type by taking the lowest score. Another exemplary method may be to take an intersection of needs vectors with the same needs type only and then take the average needs score for each type.

All these methods have their pros and cons and indicate the needs-satisfaction abilities of the choice bundle in different ways. For example, the first method indicates that all the human needs that the choice bundle is likely to satisfy, while the last method indicates that the human needs that the choice bundle is likely to satisfy the best. Assume that a travel choice bundle includes a cheap flight chocie and a luxury hotel choice. The cheap flight satisfies the human needs of "Consistency" (in service) and "Affiliation" (friendly airline), while the needs satisfied by the hotel includes "Consistency" (in service) and "Comfort". Using the first method, the integarted HNSI indicates that it satisfies the needs of "Consistency", "Comfort" (from the luxury hotel), and "Affiliation", while the last method satisfies only the need of "Consistency". If "Consistency" happens to be highly desired by the target audience, the last method perhaps is better, since the needs of "Comfort" is certainly not satisfied by the cheap flight. However, if someone has a high desire of "Comfort" vs. "Consistency" in experience, the first method may make a better sense as the person is still able to experience some level of comfort with the luxury hotel choice. Thus it may be useful to use the target individual's traits/needs to determine which integrated HNSI to use. For example, for people with an easy-going personality, the first method may be better to use since s/he would appreciate if only some of their needs are satisfied. Otherwise, it may be better to use the last approach for people who are picky and uptight. Note that module 122 has already established such human traits for each person so these traits are readily available.

Based on the approaches described above, a generalized exemplary method for computing a choice bundle's aggregated abilities to satisfy psychological needs may be formulated as follows:

$$HNSI(cb, U) = \bigcup_{i=1}^{N} HNSI(c_i) \propto W(U)$$

Here cb is a choice bundle, consisting of a set of N choices, $c_1, \ldots, c_N$. Its aggregated ability index HNSI( ) is computed by aggregating the ability indices of each choice and the aggregating method is decided by the psychological needs and human traits of target users U. Here function W( ) outputs one or more aggregation preferences that guide the integration of HNSIs of choices. As described above, for example, if it outputs <Comfort, Standard, High> to indicate the bundle is expected to satisfy the need of being comfortable across board by all items in the bundle instead of by one item in the bundle.

Using the integrated HNSI, the recommender uses the same method described above to compute the matching score between the target audience and the choice bundle.

The third situation is to recommend Individual choices to groups of people. In this case, the recommender's main task is to extract the needs of a group of people so that it can match the HNSI of a choice with the needs of the group.

As described above, each person is associated with one or more needs vectors. The consolidation process is similar to what is just described above in consolidating different needs vectors to create an integrated HNSI. However, one key difference here is that the people within a group often have relationships and such relationships may be taken into consideration when consolidating their needs factors especially when they have conflicting needs (e.g., someone prefers "Autonomy" while others want to have "Control"). One exemplary method to handle conflicts is to based on the "authority" of individuals in the group. For example, in a family, parents have more authority over children. Such authority may be set by the users themselves or inferred by the system (e.g., by ages). Another exemplary method to handle conflicts is by "majority rule" where the needs of the majority have higher priority even though the needs score might be lower than other needs. Another exemplary method is by the traits of the people in the group. For example, by their personality traits, since some are more accommodating than others, the recommender tries to accommodate these who are less accommodating to make them happier as a group. In this case, the needs of the less accommodating ones may be increased. Yet another exemplary method is to break needs vectors into several sub-groups and use the sub-groups to find suitable matches. The grouping may be done by needs types or by the trait similarity of people. This method enables the recommender to find choices that satisfy at least certain needs of most people in the group.

Similar to computing a choice bundle's aggregated abilities to satisfy psychological needs, a generalized exemplary method may be used to compute the aggregated psychological needs Needs( ) of a group g as follows:

$$\text{Needs}(g) = \bigcup_{i=1}^{N} \text{Needs}(u_i) \times T(u_i)$$

Here, the needs of each user $u_i$ in the group is taken into account during the aggregation and the user's other traits $T(\ )$ such as personality is used as a weight to guide the aggregation.

Once the needs vectors of a group are determined, the same matching approach described above may be used to recommend the choices to a group of people.

The fourth situation is to recommend choice bundles to groups of people. This is the combination of the second and the third situation. It requires the recommender to extract the integrated HNSI of a choice bundle and the aggregated needs vectors of a group of people. The methods described above may be applied and then the matches may be found.

At 942, similar to a choice query, a people query defines what kind of people to find for one or more given choices. This step is to construct one or more people queries to look for the desired people. Below is an example people query:

PQuery={<"query terms": "california female"><"result type": "individuals"><"target": "c1987"><"qthreshold": "0.6">}

Similar to a choice query, a people query also includes one or more query terms, which are the search terms indicating the specific types of peole. In the above example, it indicates that it is interested in females located in California. Note that the query terms may be missing too, which means it does not have additional requirements.

Besides query terms, a people query may also specify the type of results (result type) expected. In the above example, it expects individual people to be recommended, Instead of requesting individual people, one may request "groups" that one or more groups/communities are to be recommended. The field target specifies the target choice, the choice to whom the people recommendations to be made. It often contains the id to a choice or a choice bundle. The field qthreshold specifies the qualify threshold for acceptable recommendations as it does in the choice query. Additional fields may also be included. For example, a quantity field that indicates how many people to be recommended, or a bid field that indicates how much the requester is willing to pay for obtaining the people recommendations.

Similar to splitting an original request to generate multiple choice queries as described above, this constructor may also split an original request to generate multiple people queries. For example, an original matching request is to find people on the "west coast". Based on the location taxonomy defined in the knowledge base (140), this constructor may generate multiple people queries, each for finding people in a state on the west coast.

At 944, opposite to what described above, this step is to recommend suitable people to given choices. As described earlier, this is where choice suppliers (e.g., a company, an organization, and a brand) wants to find a target audience for their products/services/brands. Given the target choices and one or more people queries, this step is to find people whose needs match what the target choices may satisfy. Similar to the choice recommendation, it also supports four situations.

The first case is to recommend Individuals to a given choice. The process is to match the needs vector of an individual with the HNSI of the choice. The matching process is the same as described above. However, the approach to distinguish recommendation results (people) who have similar matching scores might be different than distinguishing choices mentioned above. Since this case is more outbound reaching, it may be more important to use people's traits and interests in addition to their needs to further distinguish people. For example, certain people are more willing to be interacted than others. So the traits such as Openness (one of Big Personality traits) and Friendliness (another Big 5 personality trait) may be used to separate the ranks of people if they happen to produce similar matching scores with the given choice.

The second case is to recommend Individuals to a given choice bundle. In this situation, it follows the method described earlier to computes the integrated HNSI of the choice bundle and then uses it to compute the matching scores with potential people. Again, the recommender may take into consideration of the individual's characteristics such as their emotional style (e.g., a positive vs. a pessimistic person) besides matching their needs.

The third case is to recommend groups to a given choice. In this situation, it recommends groups of people or communities to a choice. It computes the aggregated needs of each community and tries to find communities whose needs may be satisfied by the given choice. The methods on computing the needs of a group or a community are already described above. However, similar in the above case, the additional information such as the characteristics of a community may be considered during the recommendation process. For example, if a community is very diverse and lively, it might be easier to engage with the community as a whole (e.g., considering the offer of a tool for a community to experiment with). The characteristics of a community may be extracted based on the traits of individuals in that community. For example, diversity may be measured by how different community members are by their derived traits, while dynamically may be measured by the number of activities performed by different members. Using the databases (130), such information is readily available.

The fourth case is to recommend groups to a given choice bundle. This situation is the combination of the last two. It extracts the aggregated needs of a group and the integrated HNSI of a choice bundle and find groups whose needs match with the HNSI of a choice bundle. The same concerns as described above by taking into account the characteristics of a group apply hem as well.

As mentioned above, if the recommendation results have satisfied the quality criterion, they will be presented to users. The presentation results often include at least one of the following pieces of information:

The target. This is that the recommendations is made for. The target may be an individual, a group of people, a given chocie, or a chocie bundle. A profile of the target especially the needs-related information may also be displayed to inform a user what the recommendations are based on. Assume that the target is a user at a fashion e-commerce site. Her profile may include her inferred style needs along with her inferred personality traits, which informs her that what the system knows about her and uses to make recommendations. If the target is a group or a choice bundle, the associated aggregated needs vectors and the integrated HNSI may also be displayed. Such display may invite user feedback to refine the inference in the future.

The recommendations. This is the actual recommendation result. Each recommendation is displayed in the order how well it matches the target. Beside displaying the matching score, the result may also display additional information. For example, a recommended choice may include its HNSI and description, while a recommender person may include her needs vector along with other personality traits that are used to recommend her. If the recommendation is a group or a choice bundle, the associated aggregated needs vectors and the integrated HNSI may also be displayed. Such display may invite user feedback to refine the inference in the future.

The peripheral Information. Since no algorithm is perfect and not every needs/demands may be explicitly specified or aware, certain peripheral information may be useful. For example, when recommending choices to a given audience, the peripheral information may display other people who are similar to the target audience and also given or like the same choices. Such information enables the target to explore a much bigger space and discover new things beyond what they have ever thought of. For example, an individual may discover experiences that people similar to her/him have enjoyed but s/he is not aware. Similarly, when recommending people to match given choice/choice bundle, the peripheral information may be other choices or suppliers of choices that satisfy the similar human needs that the given choice satisfies. This provides choice sellers and designers with opportunities to better understand the competitions and the market place. For example, a travel company who requests the recommendations of people to try out one of their new vacation packages. Through the peripheral information, it finds similar vacation packages offered by other brands. It also discovers that these brands also offer other packages that it has never thought of offering.

Figure 11:
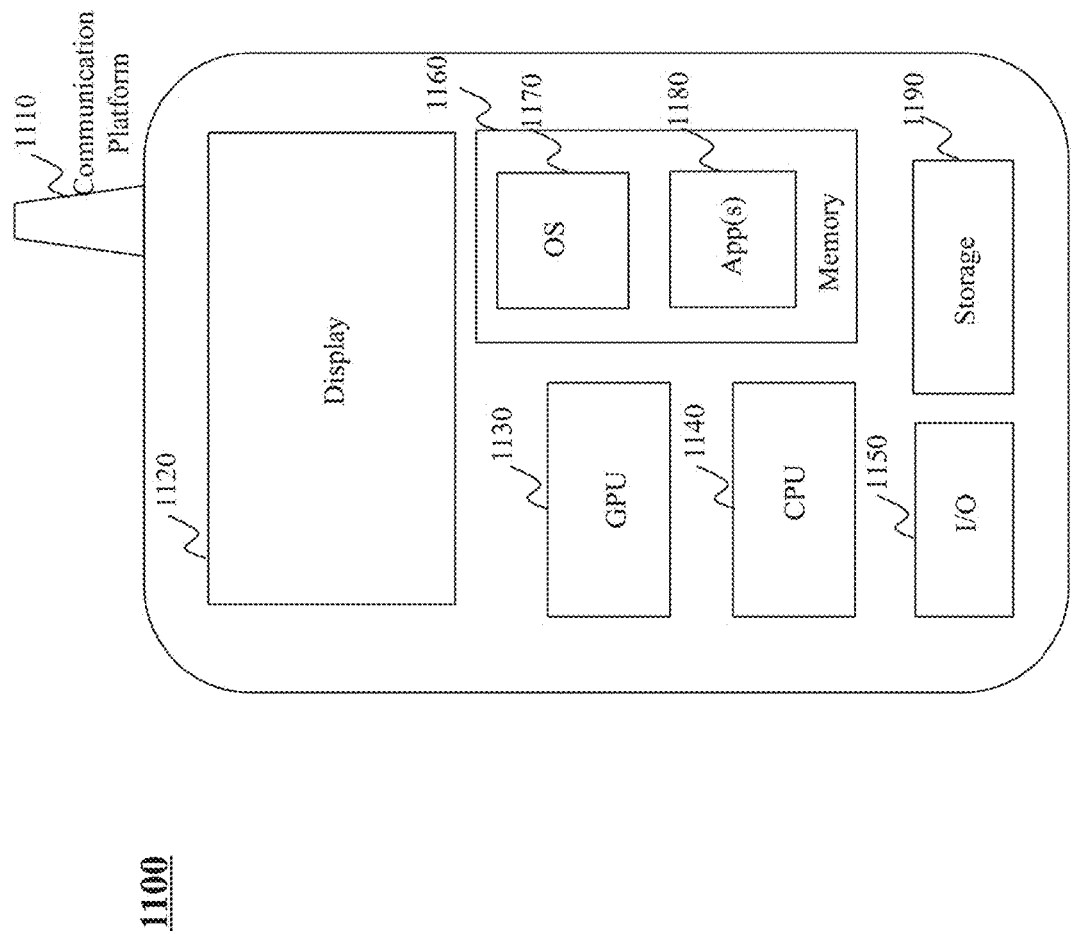
FIG. 11 depicts the architecture of a mobile device which can be used to implement a specialized system incorporating the present teaching.

FIG. 11 depicts the architecture of a mobile device, which can be used to realize a specialized system implementing the present teaching. In this example, the user device on which matching people with choices is requested and received is a mobile device 1100, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1100 in this example includes one or more central processing units (CPUs) 1140, one or more graphic processing units (GPUs) 1130, a display 1120, a memory 1160, a communication platform 1110, such as a wireless communication module, storage 1190, and one or more input/output (I/O) devices 1150. Any other suitable component, including but not limited to a system bus or a controller (not shown), may also be included in the mobile device 1100. As shown in FIG. 11, a mobile operating system 1170, e.g., iOS, Android, Windows Phone, etc., and one or more applications 1180 may be loaded into the memory 1160 from the storage 1190 in order to be executed by the CPU 1140. The applications 1180 may include a browser or any other suitable mobile apps for matching people with choices on the mobile device 1100. User interactions with the information about matching people with choices may be achieved via the I/O devices 1150 and provided to the Hyper-personalized recommendation engine 120 and/or other components of systems disclosed herein.

To implement various modules, units, and their functionalities described in the present disclosure, computer hardware platforms may be used as the hardware platform(s) for one or more of the elements described herein (e.g., the Hyper-personalized recommendation engine 120 and/or other components of systems described with respect to FIGS. 1-10). The hardware elements, operating systems and programming languages of such computers are conventional in nature, and it is presumed that those skilled in the art are adequately familiar therewith to adapt those technologies to matching people with choices as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 12:
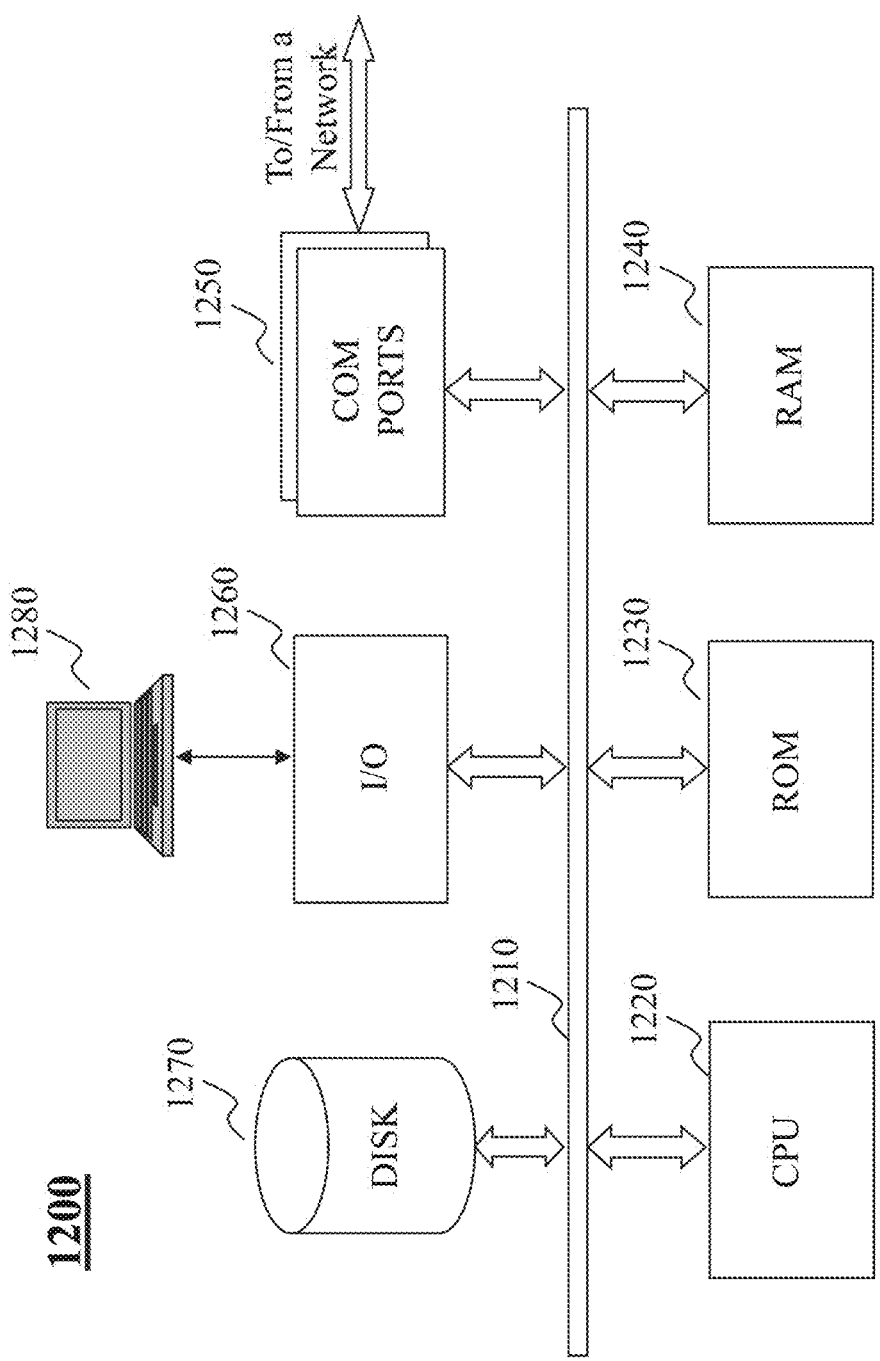
FIG. 12 depicts the architecture of a computer which can be used to implement a specialized system incorporating the present teaching.

FIG. 12 depicts the architecture of a computing device, which can be used to realize a specialized system implementing the present teaching. Such a specialized system incorporating the present teaching has a functional block diagram illustration of a hardware platform, which includes user interface elements. The computer may be a general-purpose computer or a special purpose computer. Both can be used to implement a specialized system for the present teaching. This computer 1200 may be used to implement any component of the techniques for matching people with choices, as described herein. For example, the Hyper-personalized recommendation engine 120, etc., may be implemented on a computer such as computer 1200, via its hardware, software program, firmware, or a combination thereof. Although only one such computer is shown, for convenience, the computer functions relating to matching people with choices as described herein may be implemented in a distributed fashion on a number of similar platforms, to distribute the processing load.

The computer 1200, for example, includes COM ports 1250 connected to and from a network connected thereto to facilitate data communications. The computer 1200 also includes a central processing unit (CPU) 1220, in the form of one or more processors, for executing program instructions. The exemplary computer platform includes an internal communication bus 1210, program storage and data storage of different forms, e.g., disk 1270, read only memory (ROM) 1230, or random access memory (RAM) 1240, for various data files to be processed and/or communicated by the computer, as well as possibly program instructions to be executed by the CPU. The computer 1200 also includes an I/O component 1260, supporting input/output flows between the computer and other components therein such as user interface elements 1280. The computer 1200 may also receive programming and data via network communications.

Hence, aspects of the methods of matching people with choices, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications may enable loading of the software from one computer or processor into another. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Figure 14:
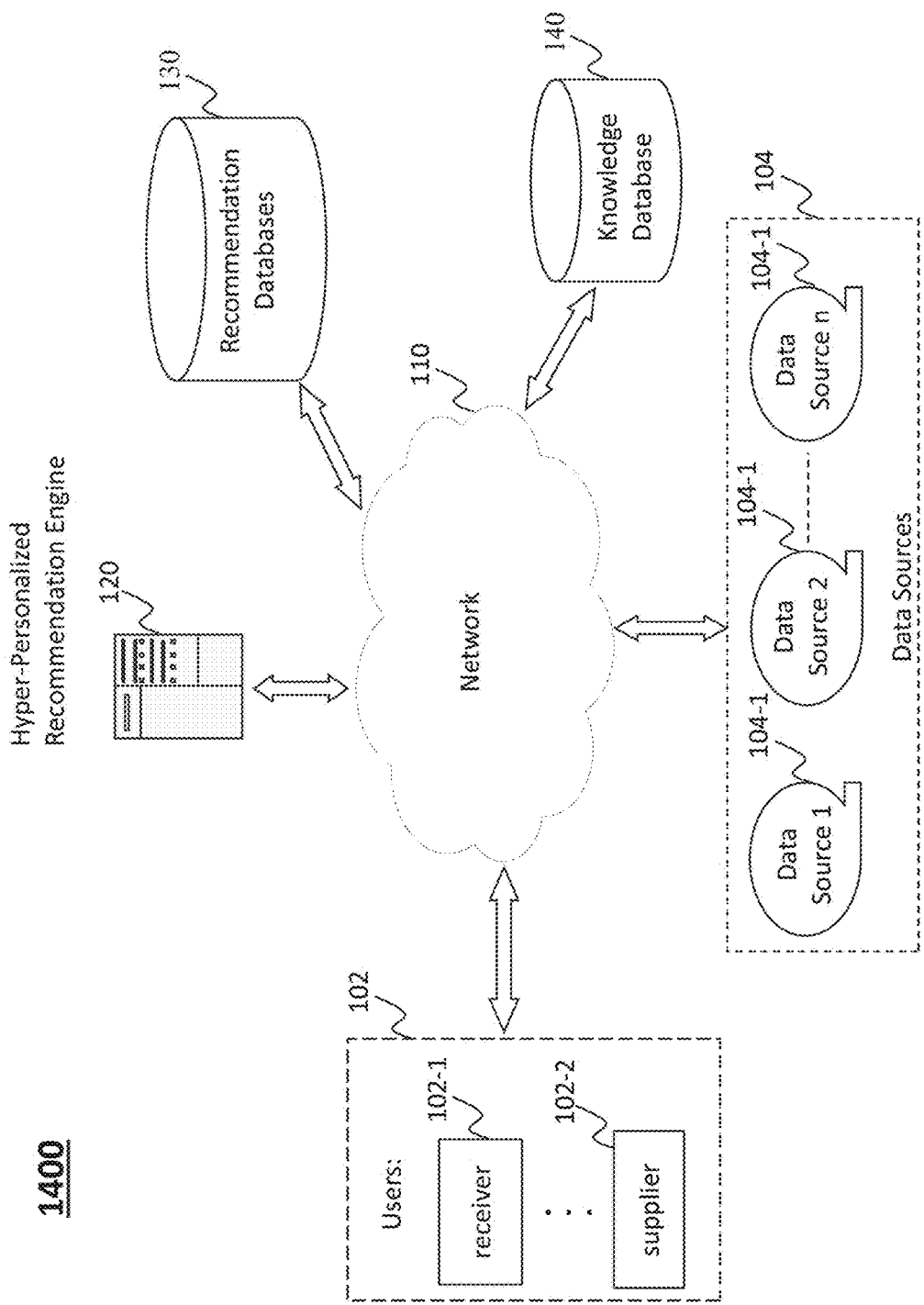
FIG. 14 is a high level depiction of an exemplary networked environment for a hyper-personalized recommendation engine, according to an embodiment of the present teaching.

FIG. 14 is a high level depiction of an exemplary networked environment 1400 for making hyper-personalized recommendations, according to an embodiment of the present teaching. In FIG. 14, the exemplary networked environment 1400 includes one or more users 102, a network 110, a hyper-personalized recommendation engine 120, recommendation databases 130, a knowledge database 140, and data sources 104. The network 110 may be a single network or a combination of different networks. For example, the network 110 may be a local area network (LAN), a wide area network (WAN), a public network, a private network, a proprietary network, a Public Telephone Switched Network (PSTN), the Internet, a wireless network, a virtual network, or any combination thereof.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, matching people with choices as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for matching users with items, comprising:

crawling information related to one or more users from a plurality of online sources, without each of the one or more users taking a test or a survey of quantitative-scale questions, wherein the crawling is performed by an application installed on at least one machine, and wherein the plurality of online sources include information about one or more types of user activities;

automatically inferring, one or more psychological needs of each user based on one or more hybrid human traits for each user, wherein each hybrid human trait is associated with a quantitative metric that is derived via a trait engine that is trained from the information related to one or more users, wherein each of the one or more psychological needs of each user comprises at least a need type, a need score, and a confidence factor, wherein the confidence factor comprises a reliability or validity score of the corresponding psychological need;

obtaining one or more items, wherein each item is associated with at least one or more psychological needs, and a corresponding Human Need Satisfaction Index (HNSI), wherein the HNSI comprises at least a need type, a need score, and a confidence factor for each psychological need associated with each item;

matching the one or more users with the one or more items based on the users' inferred psychological needs and the items' obtained HNSI to generate a matching result, wherein the matching comprises computing a weighted distance between a vector of at least the need type, the need score, and the confidence factor for the inferred psychological need and a vector of at least the need type, the need score, and the confidence factor for each psychological need associated with the each item; and providing the matching result.

2. The method of claim 1, further comprising
estimating an item's ability to satisfy psychological needs based on at least one brand persona associated with the item.

3. The method of claim 1, further comprising estimating an item's ability to satisfy psychological needs based on one or more descriptions and/or evaluations of the item.

4. The method of claim 1, further comprising estimating an item's ability to satisfy psychological needs based on estimated psychological needs and/or human traits of people who are satisfied with the item.

5. The method of claim 1, further comprising estimating an item's ability to satisfy psychological needs based on another similar item's abilities to satisfy psychological needs.

6. The method of claim 1, wherein the matching comprises matching an item bundle with one or more users based on aggregated abilities of the item bundle to satisfy psychological needs, wherein each item bundle consists of one or more items.

7. The method of claim 1, wherein the matching comprises matching a group of users with one or more items based on aggregated psychological needs of the group.

8. The method of claim 1, wherein the providing comprises presenting a matched item or item bundle to a user or a group of users based on information related to at least one of the following:
   a matching score associated with the matched item or item bundle;
   a description of the matched item or item bundle, including how the matched item or item bundle satisfies one or more psychological needs of the user or users in the group; and
   at least one other user or user group who has at least one psychological need similar to that of the user or user group.

9. The method of claim 1, wherein the providing comprises presenting a matched user or user group to a supplier of a matched item or item bundle based on information related to at least one of the following:
   a matching score associated with the matched user or user group;
   a profile of the matched user or user group, including one or more satisfied psychological needs and human traits of the user or of users in the group;
   at least one other item or item bundle that is similar to the matched item/item bundle based on their abilities to satisfy psychological needs; and
   at least one other supplier who has at least one item or item bundle that is similar to the matched item/item bundle based on their abilities to satisfy psychological needs.

10. The method of claim 1, wherein the providing comprises presenting the matching result to a third party based on information related to at least one of the following:
    a matching score associated with each of matches between a plurality of users/user groups and a plurality of items/item bundles;
    a profile of each matched user or user group, including one or more satisfied psychological needs and human traits of the user or of users in the group;
    a description of each matched item or item bundle;
    at least one other user or user group who is not in the plurality of users or user groups but has at least one psychological need similar to that of the at least one user or user group in the plurality of users or user groups;
    at least one other item or item bundle that is not in the plurality of items/item bundles but has abilities to satisfy at least one psychological need that is satisfied by at least one item or item bundle in the plurality of items or item bundles; and
    at least one other supplier who has at least one item or item bundle that is not in the plurality of items/item bundles but has abilities to satisfy at least one psychological need that is satisfied by at least one item or item bundle in the plurality of items or item bundles.

11. A system having at least one processor, storage, and a communication platform connected to a network for matching users with items, comprising:
    a human needs establishment unit configured for
        crawling information related to one or more users from a plurality of online sources, without each of the one or more users taking a test or a survey of quantitative-scale questions, wherein the crawling is performed by an application installed on at least one machine, and wherein the plurality of online sources include information about one or more types of user activities, and
        automatically inferring, one or more psychological needs of each user based on one or more hybrid human traits for each user, wherein each hybrid human trait is associated with a quantitative metric that is derived via a trait engine that is trained from the information related to one or more users, wherein each of the one or more psychological needs of each user comprises at least a need type, a need score, and a confidence factor, wherein the confidence factor comprises a reliability or validity score of the corresponding psychological need;
    a choice ability index establishment unit configured for
        obtaining one or more items, wherein each item is associated with at least one or more psychological needs, and a corresponding Human Need Satisfaction Index (HNSI), wherein the HNSI comprises at least a need type, a need score, and a confidence factor for each psychological need associated with each item; and
    a people-choices matching unit configured for
        matching the one or more users with the one or more items based on the users' inferred psychological needs and the items' obtained HNSI to generate a matching result, wherein the matching comprises computing a weighted distance between a vector of at least the need type, the need score, and the confidence factor for the inferred psychological need and a vector of at least the need type, the need score, and the confidence factor for each psychological need associated with the each item, and
        providing the matching result.

12. The system of claim 11, wherein the choice ability index establishment unit is further configured for:
- estimating an item's ability to satisfy psychological needs based on at least one brand persona associated with the item; and/or
- estimating an item's ability to satisfy psychological needs based on one or more descriptions and/or evaluations of the item.

13. The system of claim 11, wherein the choice ability index establishment unit is further configured for:
- estimating an item's ability to satisfy psychological needs based on estimated psychological needs and/or human traits of people who are satisfied with the item; and/or
- estimating an item's ability to satisfy psychological needs based on another similar item's abilities to satisfy psychological needs.

14. The system of claim 11, wherein the matching comprises matching an item bundle with one or more users based on aggregated abilities of the item bundle to satisfy psychological needs, wherein each item bundle consists of one or more items.

15. The system of claim 11, wherein the matching comprises matching a group of users with one or more items based on aggregated psychological needs of the group.

16. The system of claim 11, wherein the providing comprises presenting an matched item or item bundle to a user or a group of users based on information related to at least one of the following:
- a matching score associated with the matched item or item bundle;
- a description of the matched item or item bundle, including how the matched item or item bundle satisfies one or more psychological needs of the user or users in the group; and
- at least one other user or user group who has at least one psychological need similar to that of the user or user group.

17. The system of claim 11, wherein the providing comprises presenting a matched user or user group to a supplier of a matched item or item bundle based on information related to at least one of the following:
- a matching score associated with the matched user or user group;
- a profile of the matched user or user group, including one or more satisfied psychological needs and human traits of the user or of users in the group;
- at least one other item or item bundle that is similar to the matched item/item bundle based on their abilities to satisfy psychological needs; and
- at least one other supplier who has at least one item or item bundle that is similar to the matched item/item bundle based on their abilities to satisfy psychological needs.

18. The system of claim 11, wherein the providing comprises presenting the matching result to a third party based on information related to at least one of the following:
- a matching score associated with each of matches between a plurality of users/user groups and a plurality of items/item bundles;
- a profile of each matched user or user group, including one or more satisfied psychological needs and human traits of the user or of users in the group;
- a description of each matched item or item bundle;
- at least one other user or user group who is not in the plurality of users or user groups but has at least one psychological need similar to that of the at least one user or user group in the plurality of users or user groups;
- at least one other item or item bundle that is not in the plurality of items/item bundles but has abilities to satisfy at least one psychological need that is satisfied by at least one item or item bundle in the plurality of items or item bundles; and
- at least one other supplier who has at least one item or item bundle that is not in the plurality of items/item bundles but has abilities to satisfy at least one psychological need that is satisfied by at least one item or item bundle in the plurality of items or item bundles.

19. The method of claim 18, wherein determining the weighted distance further comprises computing a similarity between the one or more hybrid human traits of the user and the one or more hybrid human traits of other users included in the one or more users that are associated with the item.

20. The method of claim 18, wherein the application comprises an engine that interacts with a plurality of users.

21. The method of claim 1, wherein the creation of each HNSI is solicited on a crowd-sourcing platform, wherein the confidence factor of the HNSI for the each psychological need comprises a computed level of agreement between responses collected from the crowd-sourcing platform.

* * * * *